United States Patent [19]

Persoons et al.

[11] 4,229,932
[45] Oct. 28, 1980

[54] HARVESTERS

[75] Inventors: Gustaaf M. Persoons, Schoten, Belgium; Corneel C. Wijts, San Jose, Calif.

[73] Assignee: FMC Corporation, San Jose, Calif.

[21] Appl. No.: 693,615

[22] Filed: Jun. 7, 1976

[30] Foreign Application Priority Data

Jun. 13, 1975 [GB] United Kingdom ............ 25310/75

[51] Int. Cl.³ .................................................. A01D 45/24
[52] U.S. Cl. .................................... 56/13.5; 130/30 H
[58] Field of Search ............................. 56/14.3–14.6, 56/13.5, 228, 158, 208, 209, 210, 327R, 11.9, 126, 10.2, 214; 130/30 H, 30 R, 24; 171/28, 62

[56] References Cited

U.S. PATENT DOCUMENTS

| 751,073 | 2/1904 | Helgerson | 56/126 |
|---|---|---|---|
| 1,702,323 | 2/1929 | Stevens et al. | 56/124 |
| 2,236,002 | 3/1941 | Lederer | 56/14.6 |
| 2,562,338 | 7/1951 | Snyder | 209/125 |
| 2,750,726 | 6/1956 | Boucard et al. | 56/15.5 |
| 2,768,628 | 10/1956 | Hermanson | 130/30 R |
| 2,971,316 | 2/1961 | Popandopulo | 56/208 |
| 3,071,196 | 1/1963 | Scheidenhelm | 171/62 |
| 3,088,264 | 5/1963 | Sallee | 56/210 |
| 3,137,984 | 6/1964 | Shankwiler | 56/214 |
| 3,163,974 | 1/1965 | Mack | 56/214 |
| 3,306,018 | 2/1967 | Whitman | 56/126 |
| 3,457,711 | 7/1969 | Eisenberg | 56/327 R |
| 3,509,701 | 5/1970 | Clarke | 56/208 |
| 3,511,038 | 5/1970 | Gates et al. | 56/327 R |
| 3,527,304 | 9/1970 | Wilde et al. | 171/28 |
| 3,568,420 | 3/1971 | Hofer et al. | 56/208 |
| 3,597,905 | 8/1971 | Jarrell | 56/11.9 |
| 3,597,907 | 8/1971 | Neal | 56/208 |
| 3,600,882 | 8/1971 | Eisenberg | 56/327 R |
| 3,623,301 | 11/1971 | Hofer | 56/10.4 |
| 3,705,483 | 12/1972 | Jarrell et al. | 56/13.5 |
| 3,709,231 | 1/1973 | Looker et al. | 130/30 H |
| 3,721,075 | 3/1973 | Weiberg | 56/13.5 |
| 3,728,851 | 4/1973 | VanAntwerp | 56/208 |
| 3,747,311 | 7/1973 | DeCoene | 56/208 |
| 3,769,988 | 11/1973 | Burenga | 130/30 H |
| 3,771,531 | 11/1973 | Scribner | 130/30 H |
| 3,775,953 | 12/1973 | Poutsma | 56/126 |
| 3,825,018 | 7/1974 | Ferraro | 130/30 H |
| 3,826,267 | 7/1974 | Scribner | 130/30 H |
| 3,851,451 | 12/1974 | Agness et al. | 56/10.2 |
| 3,975,890 | 8/1976 | Rodger | 56/208 |
| 4,085,571 | 4/1978 | Mortier et al. | 56/208 |

FOREIGN PATENT DOCUMENTS

| 815410 | 5/1974 | Belgium | 56/14.6 |
|---|---|---|---|
| 332927 | 7/1930 | United Kingdom | 130/30 R |
| 784185 | 10/1957 | United Kingdom | 56/209 |
| 1097867 | 3/1968 | United Kingdom | 56/208 |
| 1117767 | 6/1968 | United Kingdom | 56/208 |
| 1150806 | 5/1969 | United Kingdom | 280/DIG. 1 |
| 1189705 | 4/1970 | United Kingdom | 130/27 AE |
| 1196210 | 6/1970 | United Kingdom | 56/208 |
| 1311314 | 3/1973 | United Kingdom | 56/10.2 |
| 1323773 | 7/1973 | United Kingdom | 56/208 |

Primary Examiner—Russell R. Kinsey
Attorney, Agent, or Firm—L. J. Pizzanelli; C. E. Tripp

[57] ABSTRACT

A pea harvester incorporates a threshing device and a system, known per se, which maintains the device in a fixed orientation in space irrespective of the ground contours. To feed the threshing device a series of conveyors is pivoted so that these can continue to supply the threshing device without crop loss even if a local ground irregularity deflects a forward pick-up reel which discharges on to a first one of the conveyors. The pick-up reel has a width at least equal to the widest track of the harvester wheels and the first conveyor has substantially the same width. A number of cleaning stages is incorporated and peas are received from the threshing device by two inclined vibratory conveyors the inclination of each of which is adjustable. A hopper assembly for peas is arranged forwardly of the threshing device and includes an auxiliary hopper which automatically takes the place of the main hopper when the latter is moved to its discharge position.

19 Claims, 34 Drawing Figures

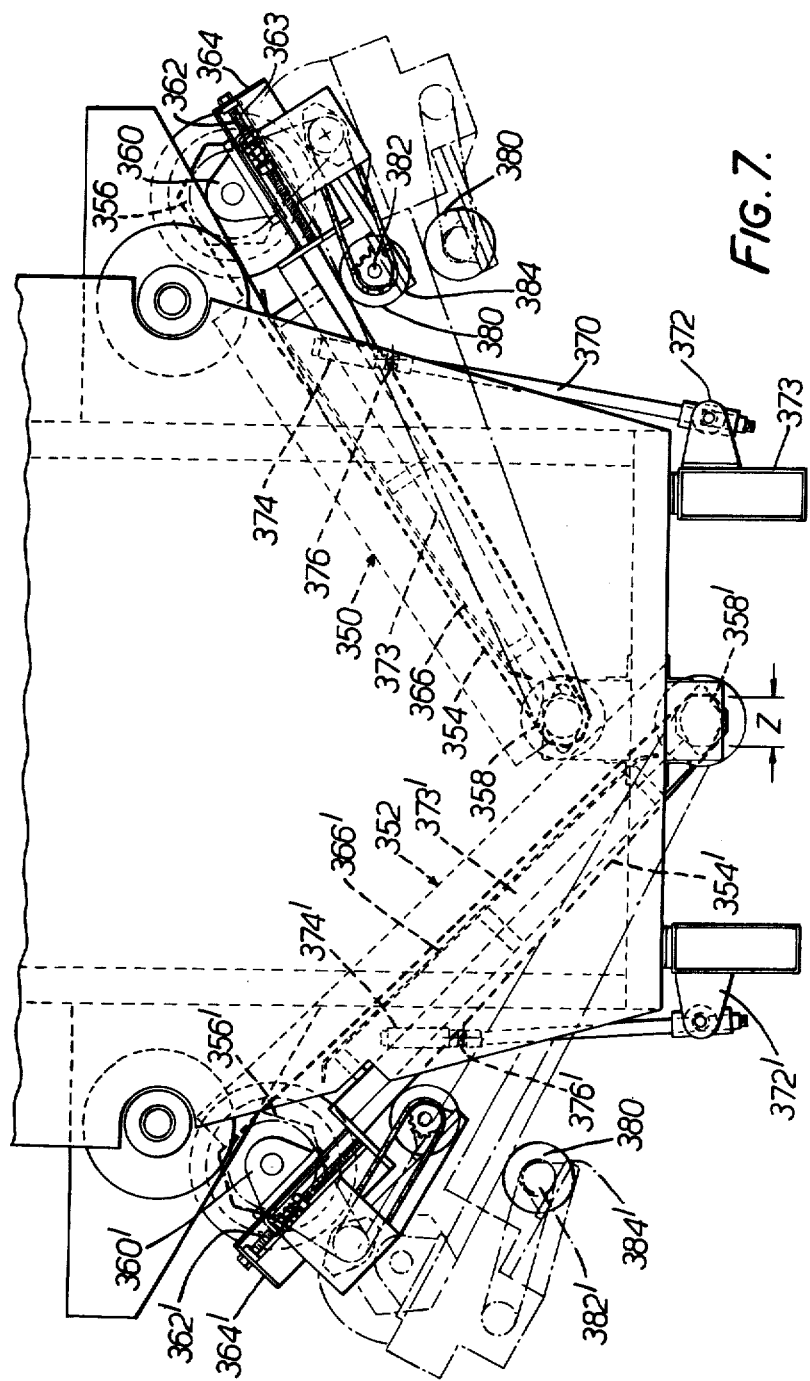

HARVESTERS

BACKGROUND OF THE INVENTION

1. Field of the Invention

This invention relates to pea harvesters.

2. Description of the Prior Art

Currently various machines are available for harvesting peas but the ever-increasing requirement for "garden" peas makes it necessary further to develop and improve such harvesting machines in order to increase the efficiency of collection and/or to enlarge the capacity of a given size of harvester. The need for efficiency in collection has become more important and will continue to do so with increasing food shortages on a world-wide scale and furthermore efficiency in collection can avoid difficulties for the grower in the following season since an excessive loss of peas in the field at harvesting can be embarrassing if a different crop is grown in the following year.

Some currently employed pea harvesting systems involve first the cutting by one machine of the rows of pea vines with the subsequent passage over the same ground of a mobile viner which threshes and cleans the pea vines which are picked up, returns the chaff, leaves and empty pods directly to the field and accumulates a store of "clean" peas for eventual transfer to a carrying vehicle.

In certain instances where the fields are a long way from the freezing plant or cannery an alternative form of viner could pick up the plants directly without previous cutting and immediately return the empty vines to the field while cleaning the pods and returning the leaves and other like matter to the field, storing undamaged pods and from time-to-time transferring them to a transport vehicle. The undamaged pods are then conveyed to the freezing plant or cannery where they are threshed and the empty pods disposed for composting while the peas are treated at the cannery for marketing.

While the possible mode of operation discussed in the immediately preceding paragraph has advantages in certain circumstances, ideally the peas are efficiently cleaned and made substantially ready at the time they leave the field for processing either by freezing or canning. Pea harvesting machines should therefore serve to pick, thresh and thoroughly clean the peas, return the empty vines to the field prior to the threshing and cleaning process and finally the chaff, leaves and empty pods should be returned to the field during the threshing and cleaning process. The peas are preferably stored and from time-to-time are transferred to a transport vehicle. Furthermore, losses should be kept to a minimum even when the harvester is working uneven ground.

Although proposals have been made for mounting pea harvesters on conventional tractors, in some circumstances, a purpose-built complete machine presents advantages since generally peas are grown as a specialist crop and the growers will be more concerned to have a readily available machine in such specialist circumstances than would be desirable where general farming is carried out.

It is accordingly one object of the present invention to provide a pea harvester incorporating a threshing means which must be maintained at a constant orientation "in space" and a conveyor system which accommodates local irregularities in the ground while continuing to feed crop to the thresher with small losses.

A further object of the present invention is to provide a hopper assembly which can receive crop continuously thereby enabling an associated harvester to operate continuously.

A still further object of the present invention is to provide a harvester in which the fore-and-aft balance of the harvester is improved.

A yet further object of the present invention is the provision in a pea harvester with a forward pick-up means and a hydraulic circuit for supporting a proportion of the weight of the pick-up means.

SUMMARY OF THE INVENTION

According to the present invention in a first aspect there is provided a pea-harvesting machine comprising threshing means, means for maintaining the orientation of the threshing means substantially constant in space irrespective of local ground slopes, and means for gathering standing crop and for passing the crop to the threshing means including conveyor means of which the orientation of individual conveyors relative to one another is adjustable within limits whereby the threshing means can continue to receive crop for threshing substantially without loss irrespective of the ground slopes over which the machine is traveling.

Further according to the present invention in a second aspect there is provided a pea-harvesting machine comprising standing-crop gathering means at the front of the machine, sensing means for controlling the orientation of the collecting means to follow the ground slopes, conveyor means rearwardly of the gathering means, threshing means rearwardly of the conveyor means arranged to receive crop from the conveyor means, means for maintaining substantially constant the orientation in space of the threshing means irrespective of the ground slopes and means linking the gathering means and the conveyor means such that the supply of unthreshed crop to the threshing means can continue irrespective of the orientation of the gathering means and the conveying means relative to the threshing means.

Still further according to the present invention in a third aspect there is provided a hopper assembly comprising a main hopper, an auxiliary hopper and linkage means connecting the two hoppers such that when the main hopper is moved from its normal, material-receiving, position, the auxiliary hopper is moved into said position to receive the material and when the main hopper is returned to its normal position the auxiliary hopper discharges material accumulated therein into the main hopper.

Yet further according to the present invention in a fourth aspect, there is provided a pea-harvesting machine comprising means for removing pea vines from the ground and for delivering removed pea vines rearwardly to threshing means, and conveyor means disposed to receive peas from the threshing means and to convey the peas forwardly of the harvester considered as a whole towards the pea-vine removing means and to deliver the peas to a storage hopper disposed forwardly of the threshing means.

Still further according to the present invention in a fifth aspect, there is provided a harvesting machine comprising a framework, a crop picking device mounted on and overhanging the front end of the framework, two support assemblies, one secured at each lateral end of the picking device and a hydraulic circuit controlled by movements of the support assemblies and including a pressure-limiting valve, the circuit serving to provide partial support for the weight of the picking device, said support assemblies serving to sense irregularities in the ground and in conjunction with said hydraulic circuit to maintain the picking device at a substantially constant height above ground level.

Still further according to the present invention in a sixth aspect, there is provided a pea harvester comprising a pick-up reel extending at least over the full width of the track of the harvester, a first conveyor of a width substantially corresponding to that of the reel and disposed rearwardly of the pick-up reel to receive vines therefrom, transverse, second, conveyors arranged to receive vines from the first conveyor and to centralize the vines to a station where they are received by an upwardly-inclined, relatively narrow, third conveyor, an elevating conveyor of a width substantially corresponding to the width of said third conveyor and arranged to convey the vines upwardly, a rotary threshing drum with its axis of rotation extending longitudinally of the harvester and disposed to receive vines from the elevating conveyor, said drum serving to thresh the peas and to deliver peas to cleaning conveyor means running below the drum, a pea conveyor extending below the threshing drum arranged to receive the peas from the cleaning conveyor means and serving to convey the peas forwardly of the harvester to an elevator serving to deliver peas to a substantially horizontal conveyor which in turn delivers the peas and any remaining trash to a movable endless sieve running over a path extending around a hopper with the upper run of the sieve lying over an opening into the hopper and allowing only peas to fall into the hopper.

BRIEF DESCRIPTION OF THE DRAWINGS

FIG. 7 is an end elevation showing cleaning apron conveyors disposed below the threshing drum;

DESCRIPTION OF THE PREFERRED EMBODIMENTS

Figure 1:
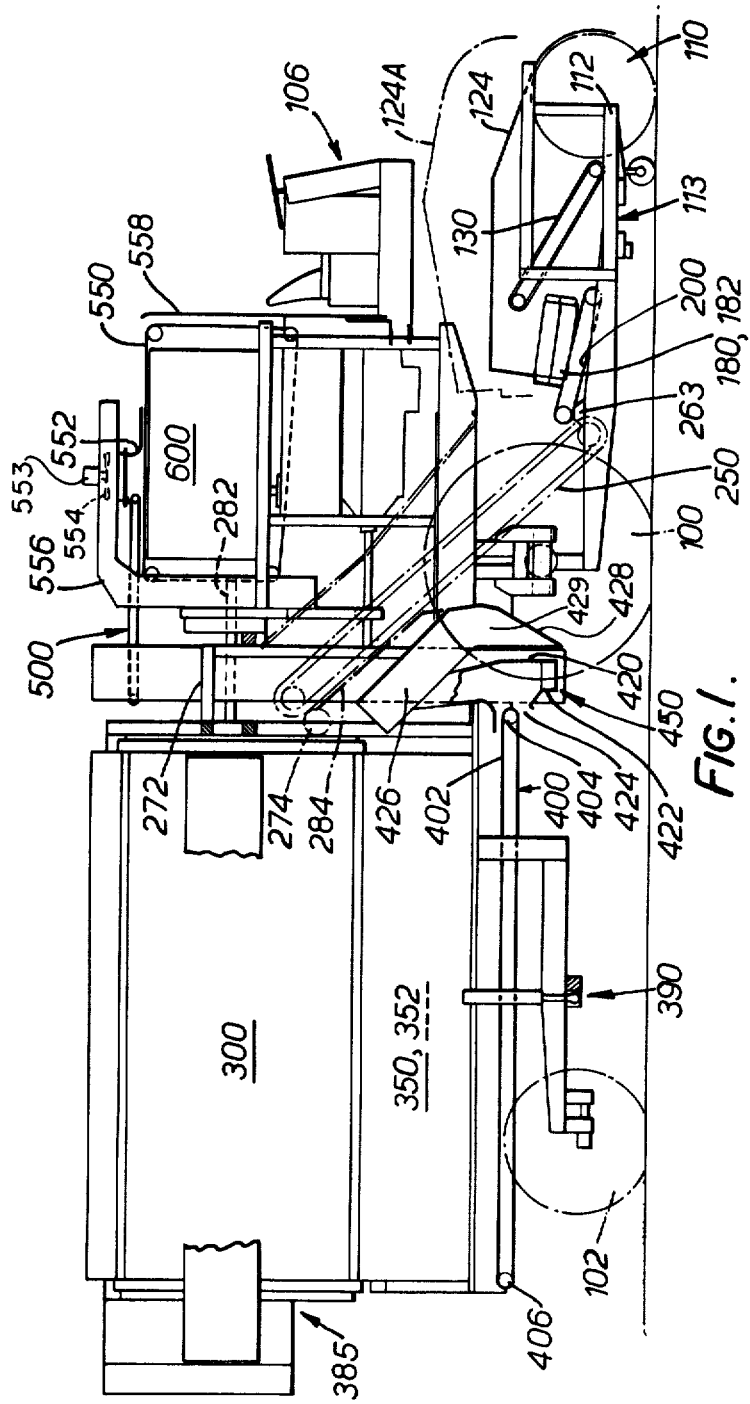
FIG. 1 is a side elevation showing an outline of the integers of one embodiment of a harvesting machine in accordance with the invention.

One embodiment of pea harvesting machine in accordance with the invention will now be described in general outline with particular reference to FIG. 1. The harvester is self-propelled and the various integers or units are supported on a frame (parts only of which are illustrated) on pairs of wheels 100, 102. The wheels 100 serve to drive the machine through a transmission (not shown) coupled to a single power source 104 (FIG. 2A). The machine is controlled from the driving position indicated generally at platform 106.

Turning now to the operative parts of the pea harvesting machine as such, the machine includes a pick-up reel 110 which extends across the whole width of the machine and at least a certain distance beyond the width of the wheel tracks, the reel being supported for pivotal motion about an axis extending longitudinally of the machine at 164 on a bean or other pick-up levelling frame 112. The reel is also supported for rotation in bearings 119 mounted on the frame 112 (see FIG. 14).

Rearwardly of the reel 110 there is provided an inclined, first conveyor 130 having a width substantially equal to the width of the reel and inclined at an angle of approximately 30° to the horizontal. The upper end of the first, longitudinally-extending, conveyor 130 overlies two transversely-extending in-feed (second) conveyors 180,182 each of which has an upper run inclined upwardly towards the centre-line of the machine. The second conveyors 180, 182 are driven so that their upper runs are moving inwardly, that is, towards the centre-line of the machine. The inner ends are spaced from one another and overlie a longitudinally extending, third, inclined conveyor 200 which is arranged for operation with the upper run moving rearwardly, as is the first longitudinal conveyor 130. The conveyor 200 is substantially narrower than the conveyor 130 and is pivotally mounted at both ends to the frame of an elevator conveyor 250 and a frame 800; (see FIGS. 19D to 19F).

The rear end of the conveyor 200 overlies and is spaced a short distance only from a lower end portion of the longitudinally-extending, elevator conveyor 250 which has a substantially greater angle of inclination than the conveyor 200. The conveyor 250 has a width substantially the same as the conveyor 200 and the upper end terminates just short of the inlet of a threshing drum 300.

Details of the threshing drum is illustrated and described in U.S. Pat. No. 3,709,231 to Looker et al (corresponding to British Pat. No. 1,396,931) and which is assigned to the Assignee of the present invention. By reference thereto it is intended that its disclosure to be incorporated herein. The longitudinally-extending, elevator, conveyor has a casing 270 (FIG. 6) which serves to ensure that the vines, pea pods and other material do not escape laterally as they are conveyed to the drum 300.

Since the drum 300 does not form part of the present invention and has been fully described in the U.S. Pat. No. 3,709,231 referred to above, substantially no further details of this construction will be given but it is necessary to state that the drum has a casing which is perforate so that separated peas may fall through onto cleaning apron conveyors 350,352 which serve to provide initial or first cleaning stage for the separated peas and extend along the whole length of the drum.

The apron conveyors 350,352, to be described in detail hereinafter, overlie a horizontal, longitudinally-extending, pea-carrying conveyor 400, an upper run 402 of which is driven in the forward direction. The conveyor includes rollers 404,406. A scraper device, not shown, may act against the conveyor at the roller 404. Adjacent the forward end of the upper run and the forward roller 404, cover 420 is provided which encloses a lower run 422 of a bucket elevator conveyor 450 and has an opening 424 which serves as an air intake. A fan 426 and an outlet thereof 428 are interconnected by a duct 429. The fan serves to draw off dust and other trash and return it to the field being harvested. This arrangement forms a second cleaning stage.

The upper end of the bucket elevator 450 discharges onto a horizontal conveyor 500 the upper run of which is arranged to be driven in the forward direction in relation to the harvester as a whole and deliver peas and any remaining dirt or other extraneous matter to an upper run of a meshed chain 550 whose openings allow the peas to pass therethrough. In the art such a chain is referred to as a podder chain. Podder chain 550 acts as a moving sieve and also forms part of the upper boundary of a main hopper 600. The upper run of the chain 550 also travels in the forward direction. In order to remove any remaining dirt, a hood 552 is provided above the upper run of the chain 550 and is connected to the inlet of a fan 554 driven by a motor 553 connected to downwardly-extending duct 556. Any unthreshed pods or debris remain on the upper run of the chain 550 and accordingly do not fall into the hopper. Such pods and debris will fall into duct 558 which lies forwardly of a vertical forward run of the chain 550 and will be returned to the in-feed conveyors 180,182 for recycling. This arrangement forms a third cleaning stage.

Figure 4:
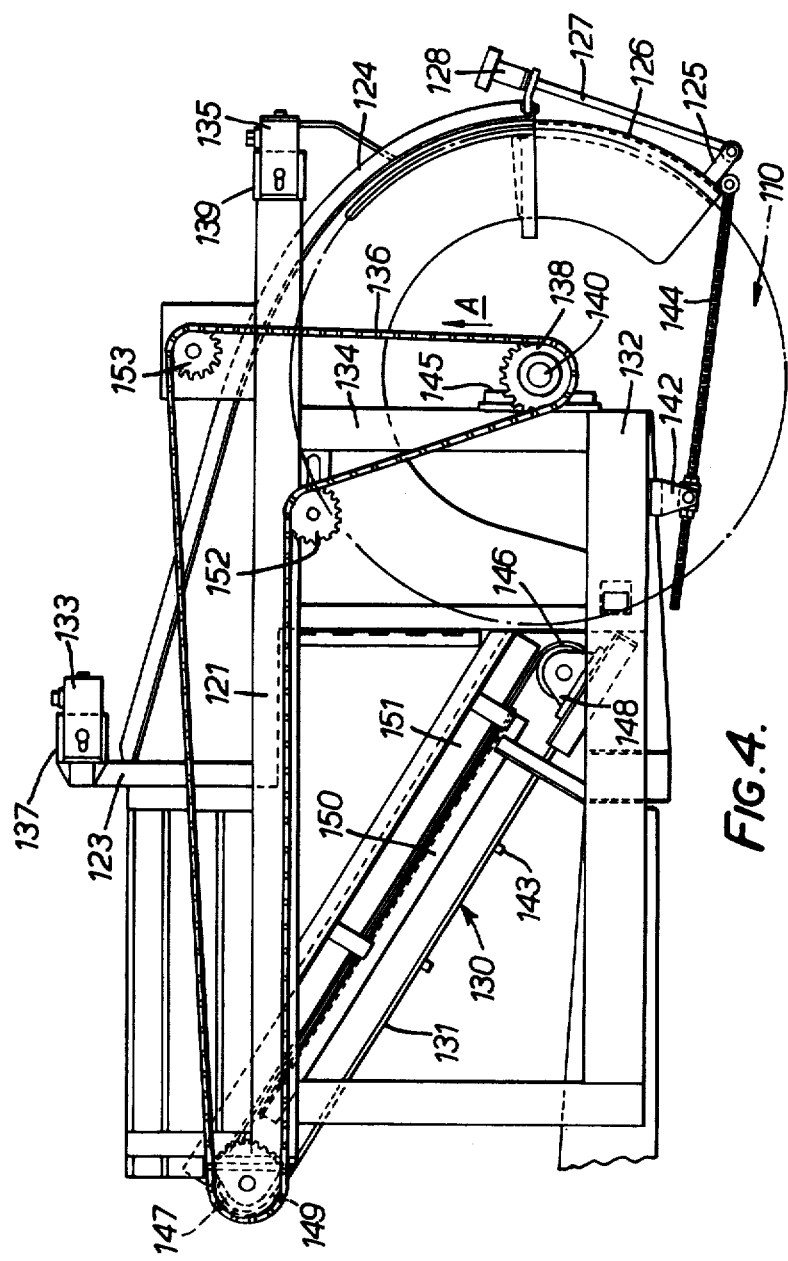
FIG. 4 is a side elevation of a pick-up reel and associated parts forming a sub-assembly of the machine illustrated in FIGS. 1 and 2.

The forward part of the machine including the pick-up reel 110 and the first longitudinally-extending inclined conveyor 130 will now be described, in greater detail, with reference to FIG. 4. The reel 110 itself is made of sheet metal rolled to form a cylinder and has secured thereto one inner and two outer discs which are secured to shaft 140. The drum supports a circumferentially spaced transverse row of conventional radially projecting steel tines.

The reel 110 is mounted for rotation within a cover 124, a forward portion of which conforms closely to the outer periphery of the reel. Rearwardly, the cover is inclined upwardly and lies above part of the first conveyor 130. The cover 124 is adjustably supported on frame members 121,123 by supports 133,135 mounted on brackets 137,139, respectively. To accommodate standing crops with large differences in height and to ensure that the crop is entirely passed to the conveyor 130 by the reel 110, an adjustable cover extension 126 is provided which is arcuately movable within a lower part of the cover 124. To effect this adjustment a bracket 125, screw 127 and adjusting nut 128 are provided.

The reel 110 is supported on the front part of the pick-up frame 132,134 and is driven by a chain 136 which drives a sprocket 138 keyed to the shaft 140. The shaft 140 is rotatably mounted in a bearing housing 145 itself secured to the frame member 134. The chain 136 is also trained around sprockets 152,153 and a further one (not shown) co-axial with an upper roller of the first conveyor 130. The chain is driven in the direction indicated by Arrow A.

A bracket 142 depends from the frame part 132 and pivotally carries a threaded member 144 which extends to the lower tip of the adjustable cover 126 of the reel; this is provided to resist the pressure of the plants against the cover 126. The extremity of the threaded member 144 is pivotally connected to the lower edge of the cover extension 126.

The first, longitudinally-extending, conveyor 130 includes rollers 146,147 which are themselves rotatably supported on bearings 148,149 and also includes a belt 131. A framework 150 extends immediately below the upper run of belt 131 so as to prevent excessive flexing with consequent dislodging of material carried by the belt. The belt 131 is provided with regularly-spaced transverse flights or slats 143 (only two shown) to assist in retaining the conveyed material. In addition, for the same purpose, a plate 151 extends above and alongside the upper run of the belt 131 and is supported from frame member 121.

Figure 5:
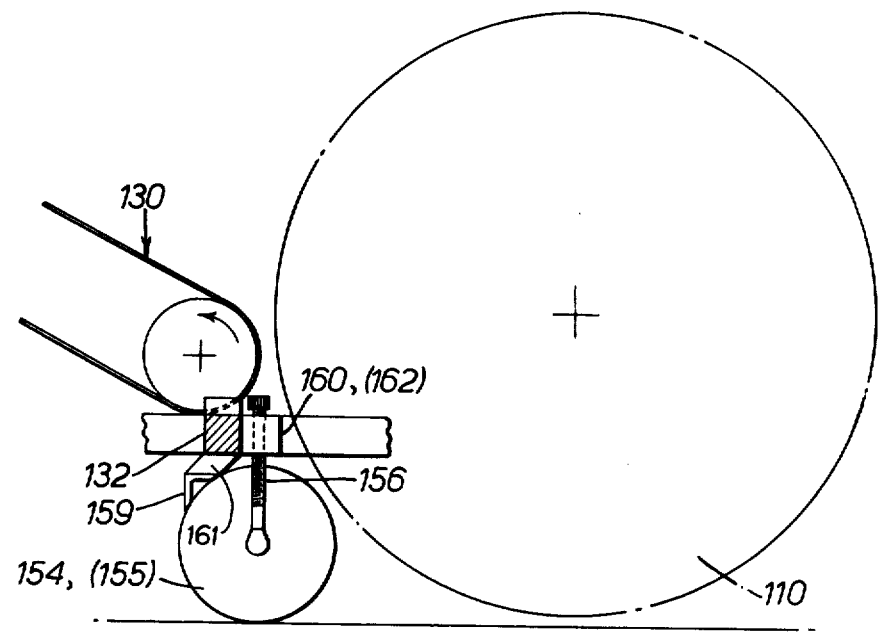
FIG. 5 is a side elevation of a detail, showing sensing means of a hydraulic, ground-following, system of the harvesting machine.
Figure 14:
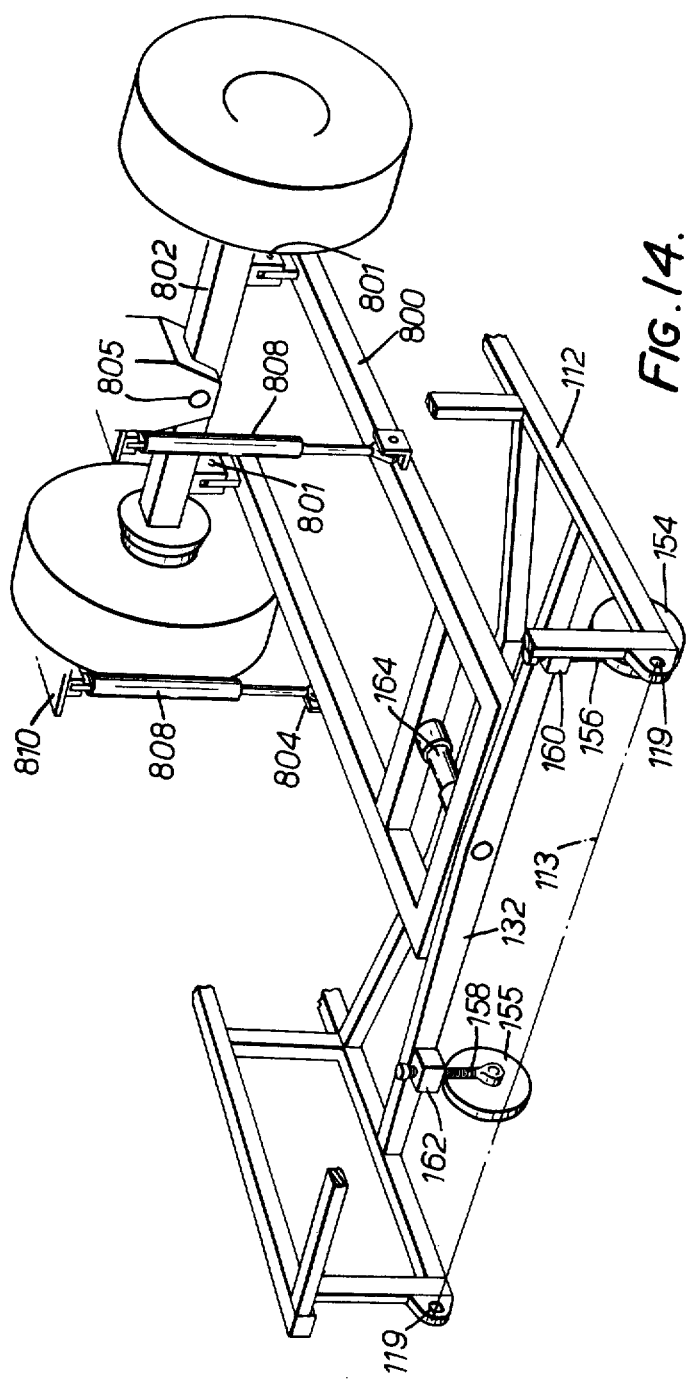
FIG. 14 is a highly diagrammatic perspective view showing the basic parts of a levelling system for the pick-up reel of the machine.
Figure 15A:
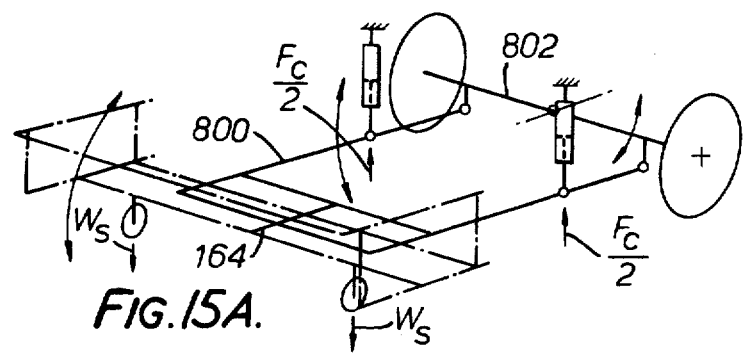
FIG. 15A is a perspective diagram of the levelling system of FIG. 14 indicating the forces which are operative.
Figure 15B:
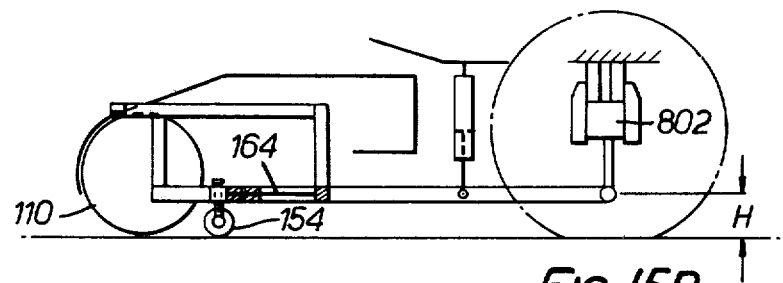
FIG. 15B is a side elevation of the levelling system indicating the operative forces.

Turning now to FIGS. 5 and 14, it will be seen that below the conveyor 130 there are provided two ground-level sensing rollers 154,155, each carried by a respective threaded member 156, 158 adjustably mounted for height on brackets 160,162 which are fixed to the pick-up frame 132. The threaded members 156,158 can be adjusted and locked in their adjusted positions by nut 156a. A dirt scraper 159 is mounted by a bracket 161 secured to the frame 132 to co-operate with each wheel which lies closely adjacent but inwardly of the corresponding transverse end of the reel 110.

It will be appreciated that the simple adjustment arrangement provides for easy and rapid adjustment for the rollers to adjust the height of the tines from the ground as the reel 110 is positioned on the pick-up frame, which itself is adjusted through the agency of the rollers. The height can be adjusted within a range of from 20 to 50 mm. depending on the height of the crop to be harvested or to prevent stones being picked up. The remaining parts of the pick-up reel levelling system will be described hereinafter with reference to FIGS. 14 to 19.

Figure 6:
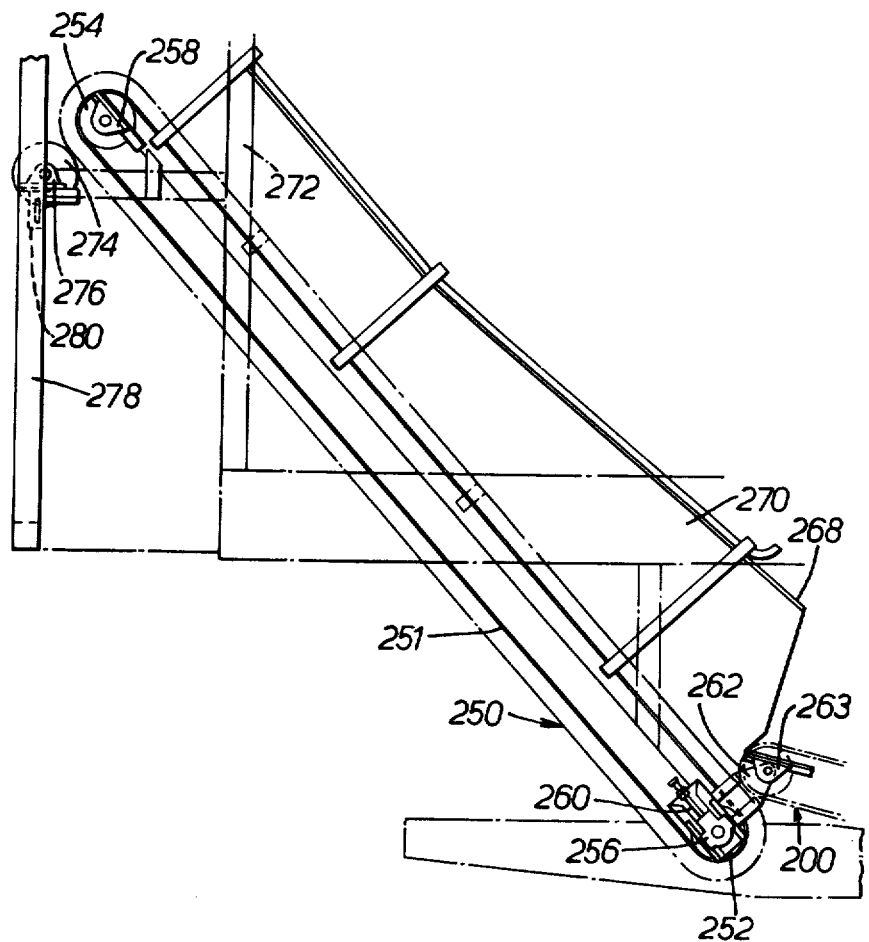
FIG. 6 is a side elevation illustrating an elevating conveyor leading to the threshing drum of the machine.

Reference will now be made to FIG. 6 which shows details of the elevator conveyor 250 mounted on a framework 250A. The conveyor comprises a belt 251 having flights or ribs (not shown) extending transversely of the belt, these flights serving to insure that the vines, pea pods and any loose peas do not fall down the upper run of the belt. The belt runs around two pulleys 252, 254 which are themselves rotatably mounted in bearings 256, carried by the framework 250A. The position of the lower bearing 256 can be adjusted by means of a screw adjustment device 260. The framework 250A of the conveyor 250 carries brackets 262 on which the rear bracket 263 of the intermediate longitudinally-extending conveyor 200 is pivotally mounted. Conveyor 250A replaces the rake-type feeders hitherto used in pea harvesters and serves to prevent loss of loose pods and loose peas on their passage to the threshing drum.

In order to prevent the vines from falling off the upper run of the conveyor as it ascends, a framework of tubes 268 is provided which extends substantially from the lower pulley 252 to the upper pulley 254, and is clad by cover plates 270.

At a level just below the axis of the roller 254 a further roller 274 is provided which serves to propel vines into an inlet opening, not shown, of the threshing drum 300. This roller 274 is rotatably mounted on bearing brackets 276 (only one shown) which are themselves vertically adjustable on a frame member 278 by means of slotted brackets 280. An upper part of the machine frame 272 accommodates a jack shaft 282 (FIG. 1) and the drive shaft of the threshing drum main beater (not shown). A sheet metal cover 284 (FIG. 1) extends across the roller 274 and an upper edge of the cover 284 lies closely adjacent the roller in order to prevent vines and pea pods falling on to the casing of the fan 426 which lies below. The cover 284 extends downwardly to join the outlet duct 428.

Figure 2A:
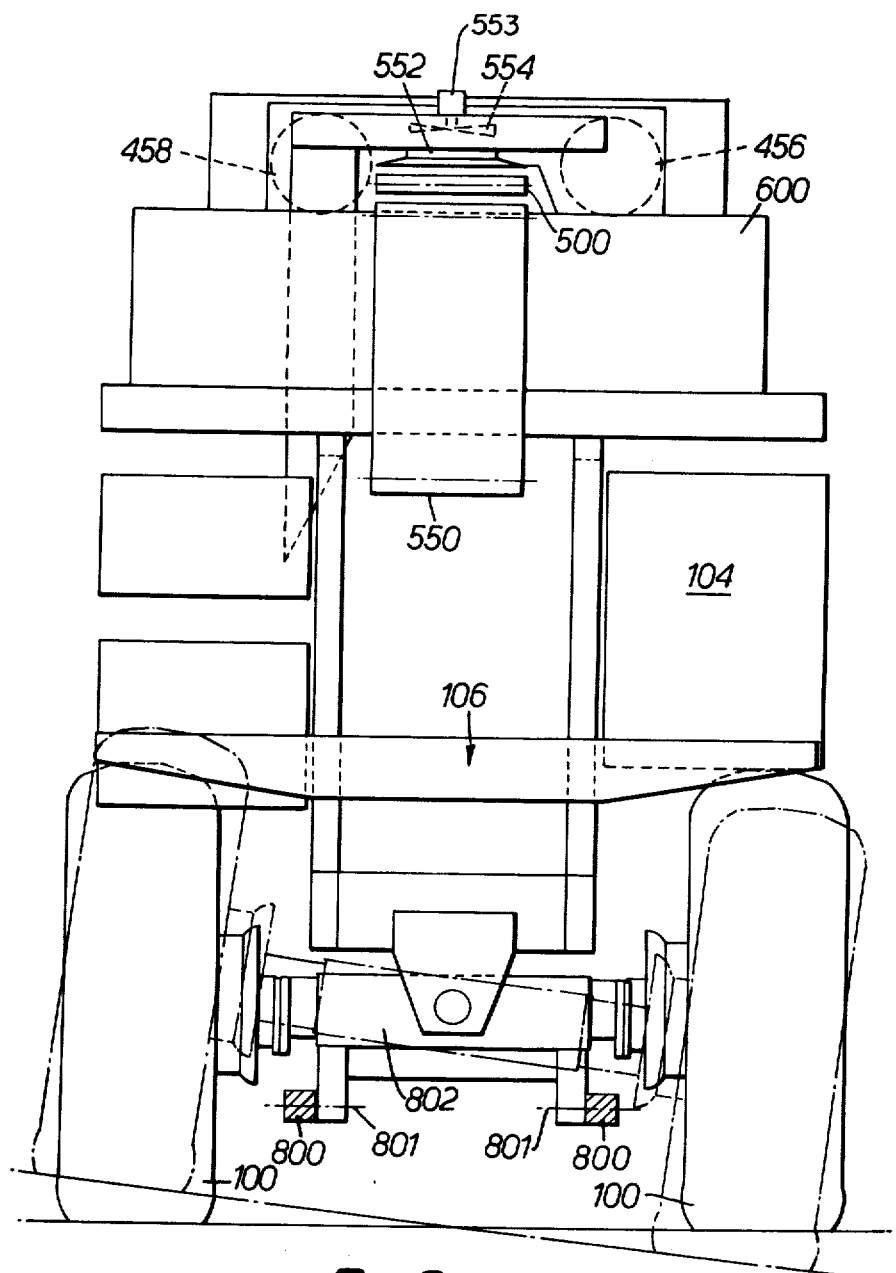
FIG. 2A is a front view of the harvesting machine with a pick-up reel and certain other parts omitted.
Figure 2B:
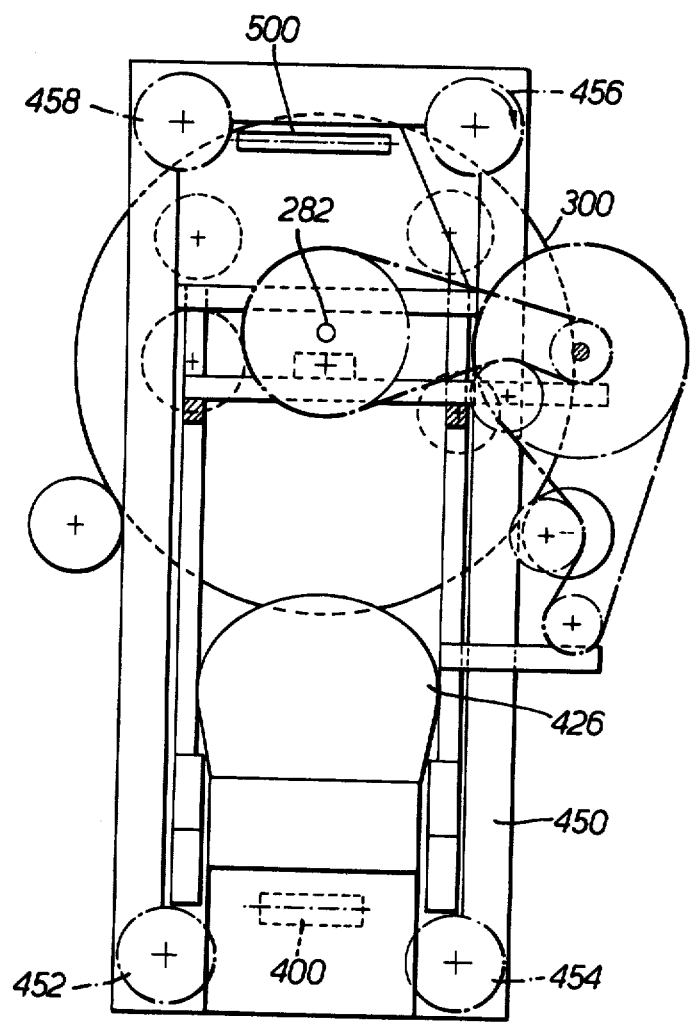
FIG. 2B is a vertical section taken approximately at a bucket elevator just forward of a threshing drum of the machine.

The elevator conveyor is so mounted that it follows the movements of the threshing drum 300 caused by a known levelling system (shown in part at 390 in FIG. 1).

Since full detail of the beater drum and its leveling is given in U.S. Pat. No. 3,709,231 no further description will be given.

Figure 3:
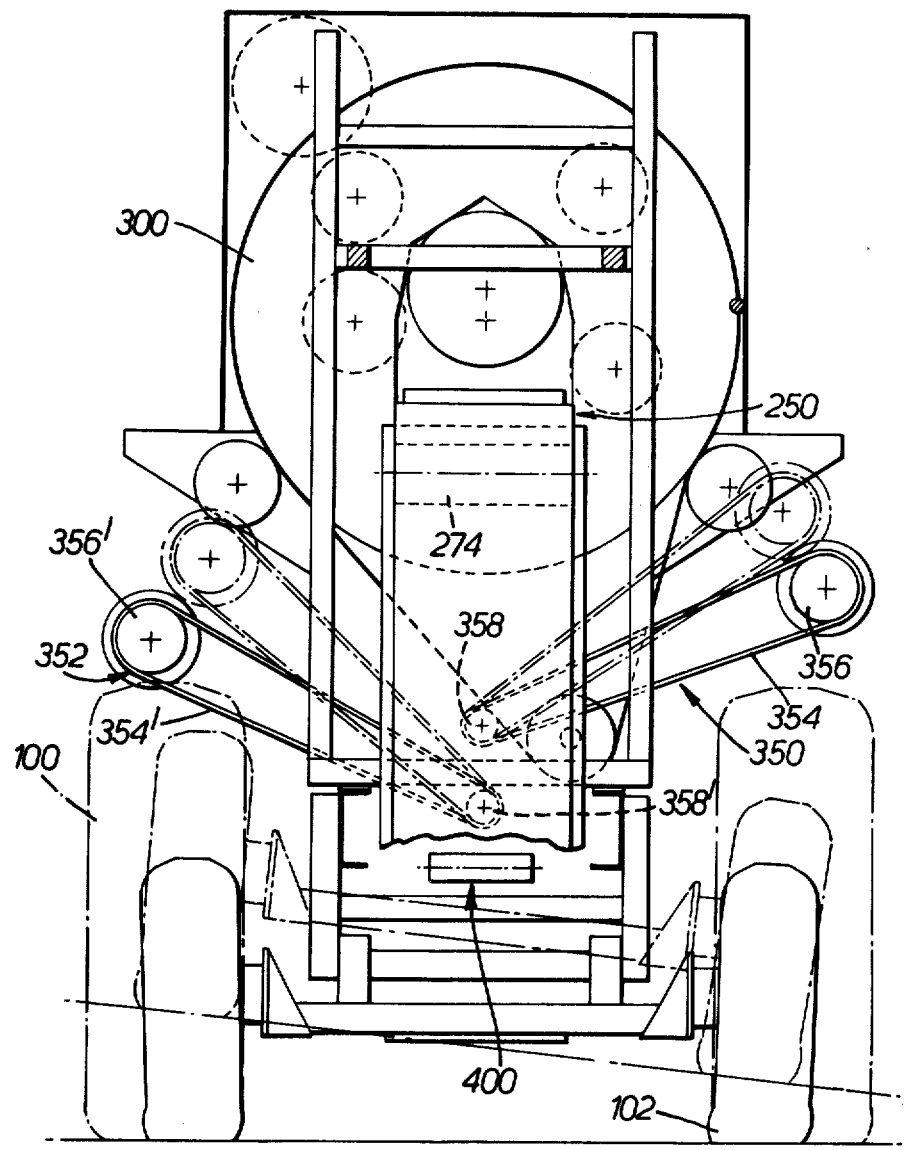
FIG. 3 is a vertical section at the rear axle of the machine, certain parts being shown in alternative positions.

As shown in FIGS. 3 and 7 two cleaner apron conveyors are provided below the threshing drum 300, one of the aprons, 350, having a lower end portion which overlies a lower end portion of the other apron, 352. Since the construction of both apron conveyors is in substance the same, similar reference numerals will be given in the drawings with the addition of a prime to the parts apertaining to the conveyor 352.

Figure 8:
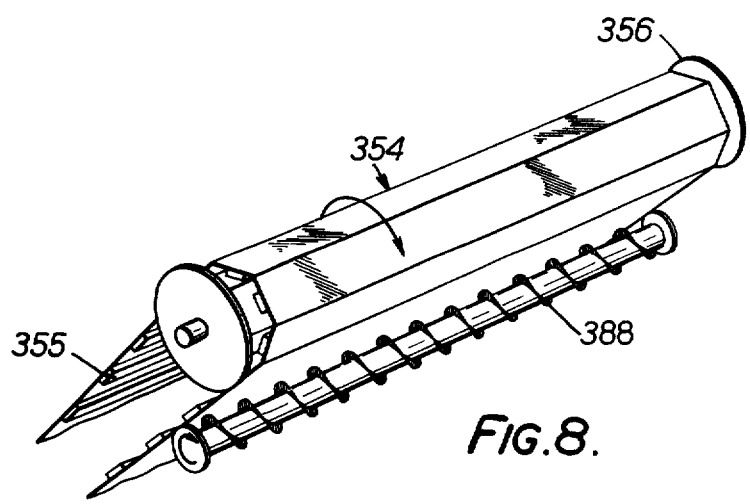
FIG. 8 is a perspective view of a part of one of the conveyors of FIG. 7.

Each apron conveyor comprises a belt 354 with slats 355 (FIG. 8) on its under-surface drivable around an outer, hexagonal, roller 356 and an inner, octagonal, roller 358. Both the slats and the rollers generate continuous vibration in the belt as a whole which separates the peas from the dirt, so that peas can roll down more easily. The upper roller 356 is mounted in bearing blocks 360 which are mounted on a bracket 360a slidable in a frame 364.

A spring device 362 tensions the belt 354 by pulling upward the upper roller via the slidable bracket. The spring device 362 will also take up any slack in belt 354 and, thus, keep it taut. The tension in the apron conveyor belt can be adjusted by means of a screw 363.

A framework 366 with down turned end supporting members is mounted underneath the upper run of the apron conveyor belt, to ensure that the upper run does not sag unduly during the vibratory action. The lower roller 358 is pivotally mounted so that, as is apparent from FIG. 7, the apron conveyor as a whole can be angularly adjusted to accommodate differing field conditions while the overlap distance "Z" remains unchanged. Thus no change in pea transfer action is encountered.

Angular adjustment is provided by threaded struts 370 (one on each side of the apron conveyor) each pivotally mounted at its lower end on a bracket 372 connected to support structure 373 of the apron, through a ball and socket or "knuckle" joint 376. This joint 376 enables the bracket 374 to be fixed relative to the structure 373.

As the whole apron assembly of belt 354, rollers 356 and 358, support 366 and drive (as explained hereafter) is mounted on the frame 373, it is only necessary to turn the struts 370 to effect a simple and fast angular adjustment, without disturbing the physical relationship of each part one to another.

Drive to the apron 350 is effected through a sprocket transmission 380 from an hydraulic motor (not shown). The motor is mounted on the fixed frame 364 by means of an adjustable support. The motor is located directly beneath the roller 356 such that the roller movement, due to the slats passing the rollers, does not affect the chain transmission lengthwise. The motor shaft is referenced 382.

The lower run of the apron conveyor belt is cleaned before receiving new product and dirt. This is effected by a powered spiral brush 388 (see FIG. 8) which turns in the opposite sense to the movement of the lower run. Drive to the brush is by a chain transmission from the hydraulic motor also driving the apron conveyor itself.

Figure 9:
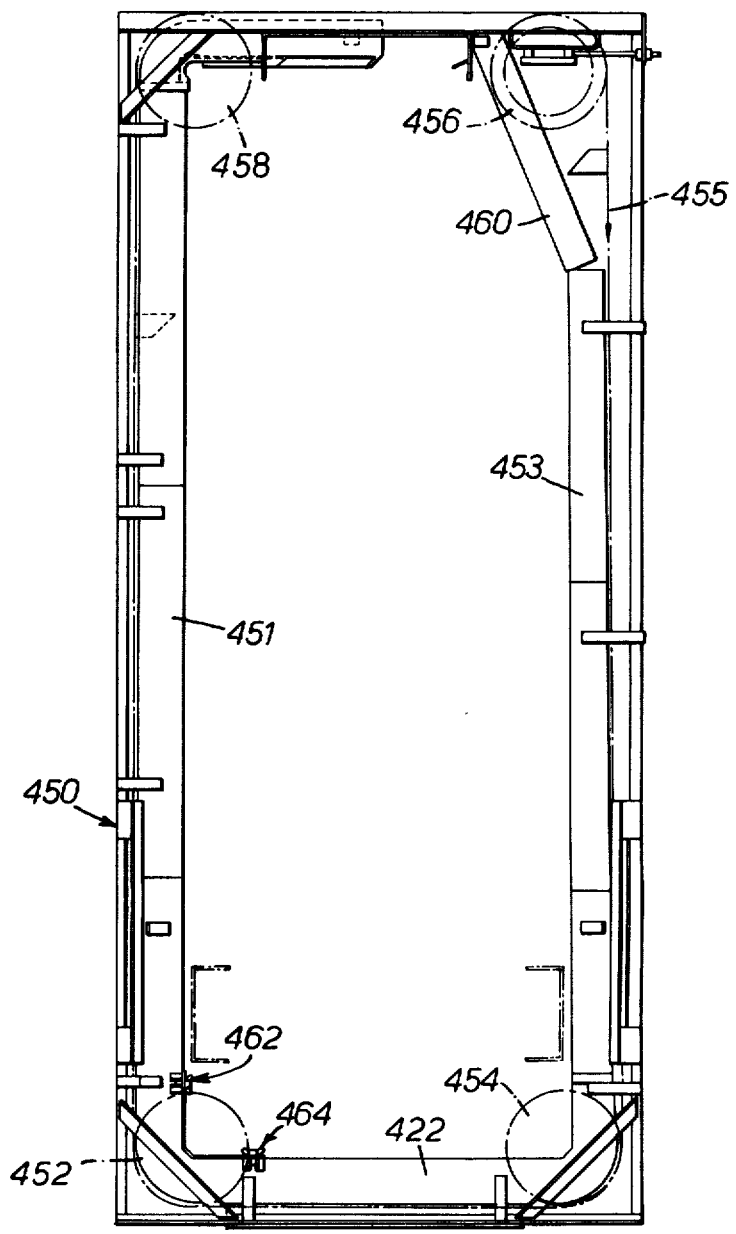
FIG. 9 is a front elevation showing a bucket elevator for raising peas delivered from a horizontal conveyor extending below the threshing drum to a hopper conveyor arranged to convey the product into a hopper via a moving sieve; the hopper lies near the front of the harvester.

The bucket elevator 450 is shown in FIG. 9. The frame 451 carrying parts of sprocket wheels 452, 454, 456 and 458 is not a true rectangle and one side part 453 of this frame is inclined to the vertical and a portion 460 of this part 453 is inclined to the vertical at a greater angle. This is to enable peas which did not fall out of the buckets to fall easily back into the buckets in the lower part of the elevator.

Furthermore, it provides enough room for the tensioning of the sprocket wheels 456. It will be noted that the part of the frame carrying the sprocket wheels 452 is readily detachable with the aid of pivotal wing nuts 462, 464. The angled part 460 of the frame is so constructed to enable the horizontal conveyor 500 to readily receive material from the buckets (not shown) at their discharge positions immediately adjacent the sprocket wheels 458. The buckets are carried between two chains, one of which is indicated at 455. As viewed in FIG. 9, the bucket elevator circulates in a clockwise sense. Drive to the bucket elevator is effected through the same sprocket wheels 456 through a dog clutch (not shown). The sprocket wheels 452, 454, 456 and 458 are supported on pairs of bearing blocks, not shown, and the bearing blocks of sprocket wheels 456 are adjustable to vary the tensions in the chains. Drive to the bucket elevator is provided through a dog clutch 470 shown in FIG. 10, the slip half of the clutch also forming part of sprocket wheel 472. The wheel 472 is driven from a gear box 474 through a chain 476.

Figure 10:
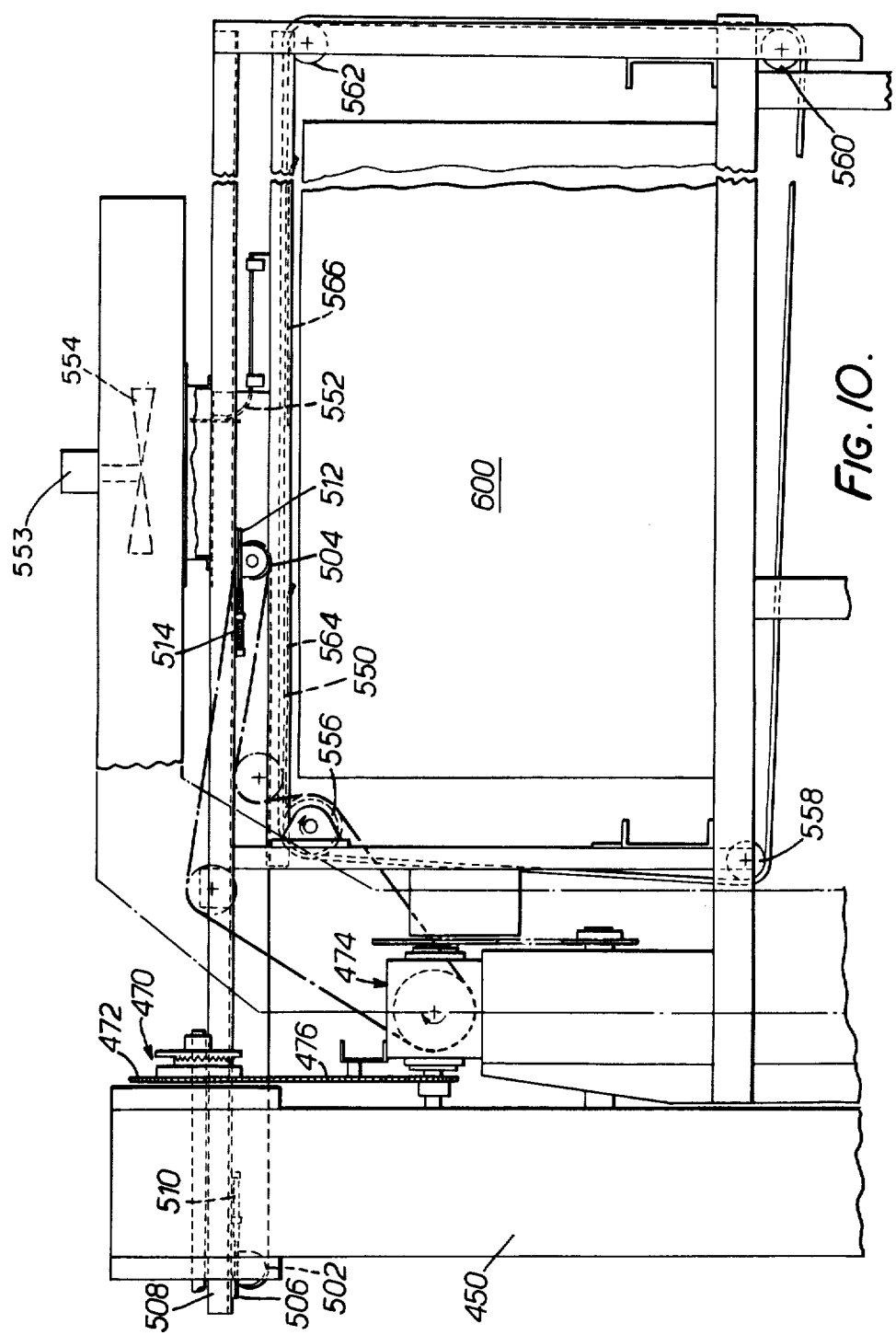
FIG. 10 shows the hopper and an associated sieve conveyor, an upper run of which lies above the hopper entry.
Figure 11:
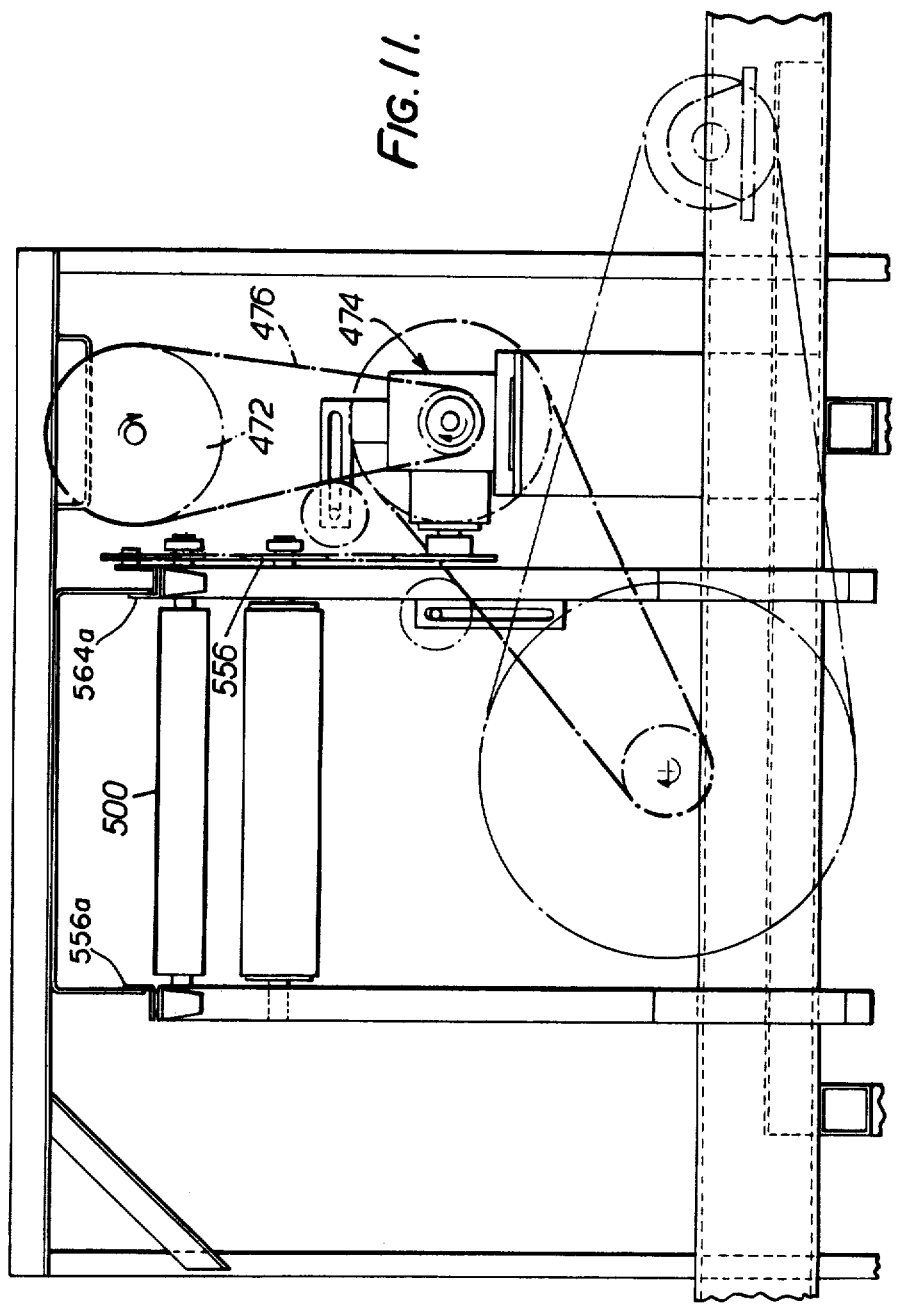
FIG. 11 shows further details of the sieve conveyor of FIG. 10 and also a hopper.

FIGS. 10 and 11 illustrate the hopper 600 and the conveyor 500 leading from the upper end of the bucket elevator 450 to overlie at its other end the podder chain or sieve 550. The conveyor is a generally conventional horizontal conveyor and is mounted on a roller 502 adjacent the upper end of the bucket elevator and a roller 504 adjacent the fan inlet duct 552. The roller 502 is supported on suitable bearing brackets 506 (only one shown) from a member 508 of the framework. The bracket 506 is adjustable whereby to vary the tension in the belt by a threaded device 510. The roller 504 is similarly supported from a bearing bracket 512 adjustably located by a threaded device 514.

The podder chain or sieve 550 which is made of mesh is suitable to allow peas of the largest size to fall through while rejecting any remaining pods, pieces of empty pods or pieces of stem. The sieve is trained around four rollers 556, 558, 560 and 562 carried by a box-like frame 563 disposed approximately at the corners of the hopper 600. Each roller is mounted in appropriate pairs of brackets at least one of which is adjustable to vary the tension in the sieve mesh. The mesh is supported along its upper run by plates 564,566 secured to angles 564a and 566a are spaced apart a distance corresponding substantially to the fan inlet opening 552. The podder chain is very much narrower than the hopper, for example, it may be only one quarter of the width.

Figure 12:
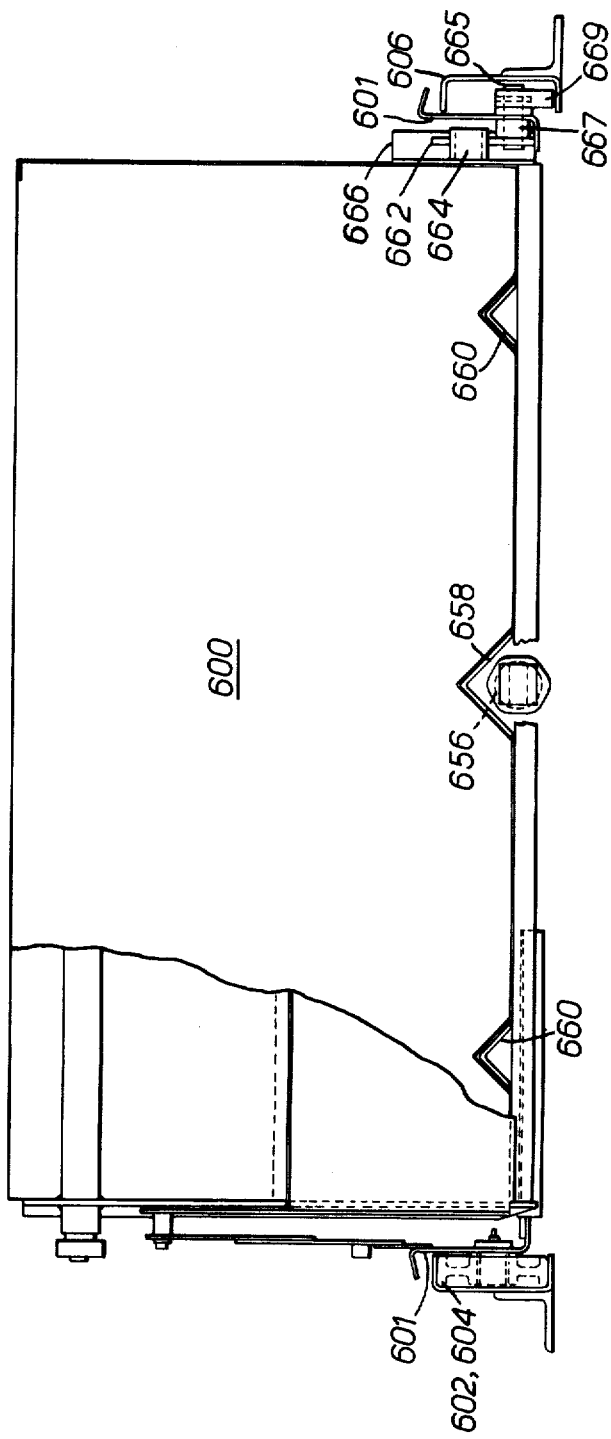
FIGS. 12 and 13 show further details of the hopper of FIG. 10.
Figure 13:
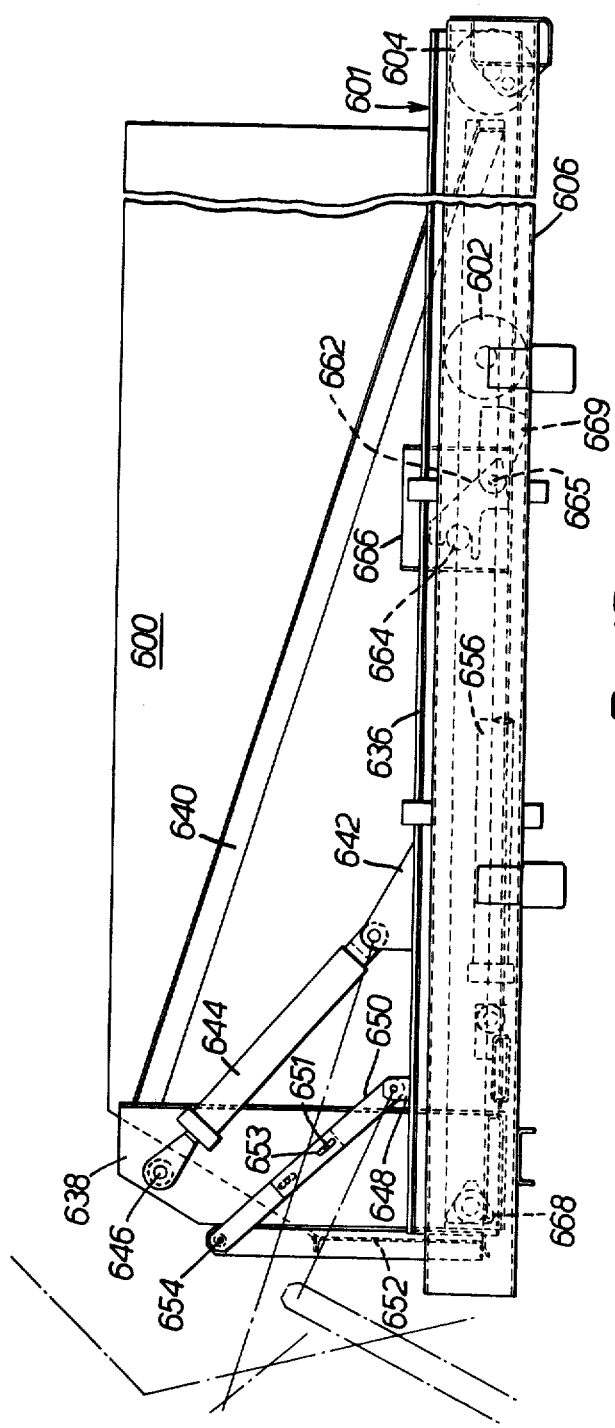

Constructional details of the hopper are illustrated in FIGS. 12 and 13 but the overall hopper arrangement will first be described with reference to FIGS. 20 and 21A, 21B, 21C and 21D. The main hopper 600 is mounted for movement transversely of the harvester on a support trolley 601 having pairs of wheels 602, 604 which run on tracks 606 (only one shown) mounted on the framework of the harvester. The moving sieve 550 discharges peas into the hopper at approximately mid-length of the latter. In addition to the main hopper 600, the overall arrangement includes a secondary or auxiliary hopper 620 (shown in perspective in FIG. 20) pivotally mounted at 622 on members 624 upstanding from the support trolley 601 of the main hopper. The secondary hopper 620 is also pivotally connected at 628 to one end of a linkage 630 supported at its other end for pivotal movement at 632 on struts 634 upstanding from the frame of the podder chain 550.

Referring again to FIGS. 12 and 13, the main dump hopper 600 is of generally rectangular section and is mounted on the trolley 601 which takes the form of a generally rectangular framework 636 mounted on the pairs of wheels 602 and 604 (for the sake of clarity shown only on one side in FIG. 12). The dump hopper 600 itself is also rigid with two members 638 (only one shown) which in FIG. 13 are upstanding and each member 638 is welded to a respective reinforcing angle member 640 extending approximately diagonally across the dump hopper. The trolley 601 carries towards the left-hand end (FIG. 13) a pair of upstanding brackets 642 (only one shown) each of which provides a pivotal connection for one end of a hydraulic actuator 644 the other end of which is pivotally connected at 646 to the upstanding member 638. A corresponding actuator is also provided on the opposite side of the hopper.

Two further brackets 648 on the trolley each provide an end pivotal support for a linkage 650 which serves, in the dumping position to open, automatically, an end cover assembly 652 and this linkage comprises an extensible strut formed in three parts interconnected by pivot pins 651 running in elongate slots 653. The other end of the linkage 650 is pivoted at 654 to one of two (only one shown) members which carry the openable end cover assembly 652 of the hopper. As will be appreciated from inspection of FIG. 13 the end cover is opened by the tilting motion of the hopper effected by the hydraulic actuators 644. The end cover is automatically re-closed when the hopper is returned to its normal orientation. The open position of the end cover 652 is indicated in chain lines in FIG. 13.

In order to move the trolley 601 and the hopper 600 carried thereby, a single hydraulic actuator 656 (broken lines) is provided which lies in a recess formed by a reinforcing member 658 of angle section forming part of the trolley and accommodated in a complementary recess in the base of the hopper. This actuator 656 operates between the trolley 601 and a fixed part of the framework of the harvester. The trolley also includes two further angle members 660 disposed symmetrically with reference to the hydraulic actuator 656 and similarly accommodated in complementary recesses in the base of the hopper.

To ensure that the main hopper does not tilt when in its normal, horizontal position, two bifurcated yokes 662 (only one shown in broken lines in each of FIGS. 12 and 13) are provided which engage a respective pin 664 rigid with a channel member 666 secured to the hopper. The yokes are pivoted on the trolley 601 by a pivot pin 665 rotatable in a sleeve 667. The pivot pin 665 also carries a latch 669, both the yoke and the latch being mounted for rotation with the pivot pin. The pin 664 is normally engaged by the yoke, but when the trolley 601 reaches the dump position, the latch drops down into a slot in the track 606 so that the hopper is free to tilt and discharge its load.

It is believed that the operation of the main hopper and the secondary hopper is readily apparent from FIGS. 21A through 21D but brief reference will nevertheless be made to the mode of operation.

It will be appreciated that continuous operation of a harvester can be of considerable importance when weather conditions are adverse or threaten to become adverse. It follows that the time required to stop the machine and unload the hopper, which may be up to ten minutes, is disadvantageous since a considerable quantity of crop can be gathered in that time. The hopper arrangement in accordance with the invention includes the secondary hopper 620 which is automatically placed in position when the main hopper 600 is moved from its normal position to its discharge or dumping position (FIG. 21C).

Figure 21A:
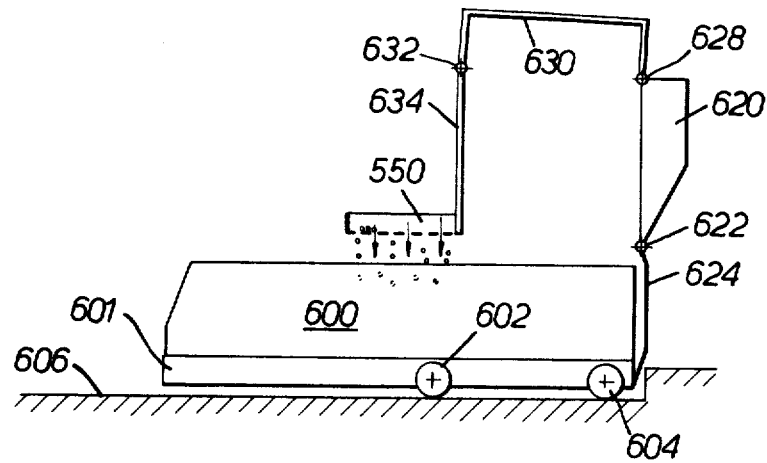
FIGS. 21 and 21D are diagrams illustrating the hopper assembly operation.
Figure 21B:
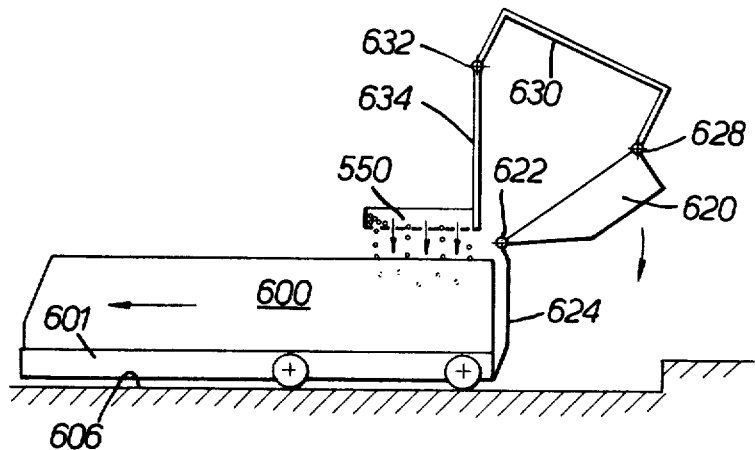
Figure 21C:
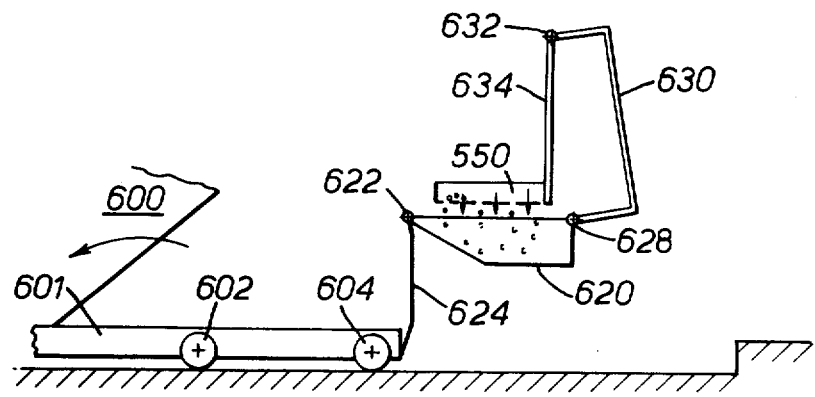

In FIG. 21A the main hopper is receiving peas from the moving sieve or podder chain 550 and the secondary hopper. As indicated in FIG. 21B, when the hydraulic actuator 656 moves the main hopper to the left, the configuration of the linkage 630 and its pivot connections is such that the secondary hopper 620 is swung downwardly and also carried by the members 624 towards the moving sieve or horizontal podder chain 550.

Figure 21D:
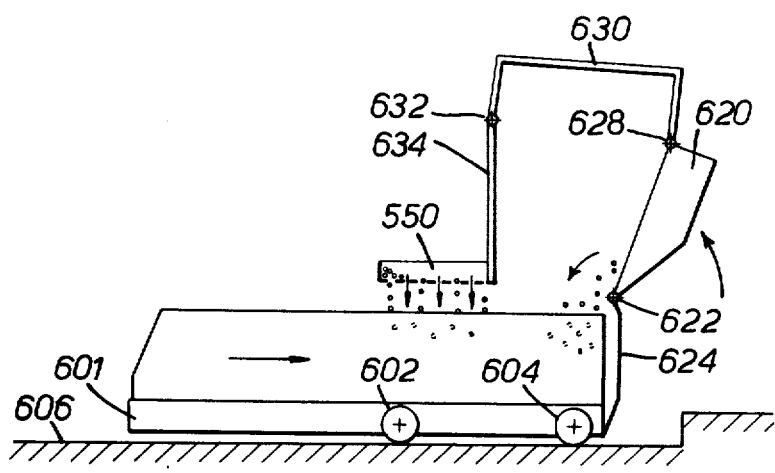

When the main hopper 600 reaches the dumping position illustrated in FIG. 21C, the secondary hopper 620 is swung to a final, horizontal, position immediately below the moving sieve 550. The main hopper is tilted about the left-hand pivot 668 after the latches 669 have pivoted to release the yokes 662 and immediately discharge has been completed, the trolley 601 is moved back towards the right as indicated in FIG. 21D, the secondary hopper 620 is automatically tipped towards the vertical position shown in FIG. 21A and the peas collected during the dumping operation are discharged into the main hopper 600.

It will be readily apparent that this simple arrangement enables continuous collection of peas without the harvester being stopped for the purposes of unloading since a receiving vehicle can be driven alongside the harvester and the secondary hopper 620 continues to receive peas during the unloading time.

It is desirable that the pick-up reel 110 or other pick-up device should follow both lateral and fore-and-aft changes in ground contour. Numerous systems have been proposed for controlling these changes but these have tended to be overly complex which is undesirable under conditions normally encountered in agriculture. The levelling system for the reel 110 herein described is simple and robust but nevertheless is capable of accommodating any changes in ground contour. The system involves essentially the use of ground-level sensing rollers 154, 155 adjacent the pick-up reel 110 of the harvester, these rollers supporting only a small proportion of the weight being supported by one or two or more hydraulic cylinders.

The levelling system for the pick-up reel must not only follow field irregularities, it must also ensure a trouble-free product transfer, irrespective of the irregularities from the pick-up reel 110 to the elevator conveyor 250. As the elevator conveyor 250 is fixed on the machine frame which frame will always remain horizontal due to the levelling system of the threshing device of the harvester known per se and therefore not described herein, this means that the pick-up device as a whole must be able to follow the fore and aft and lateral slopes of the field (on which the threshing device means of the harvester remains horizontal) but also to follow the field irregularities on these slopes (see FIG. 15C).

The device as described hereinafter provides this ability and further, it ensures a proper product transfer in every possible configuration of the reel and conveyors relative to the threshing device.

Figure 15C:
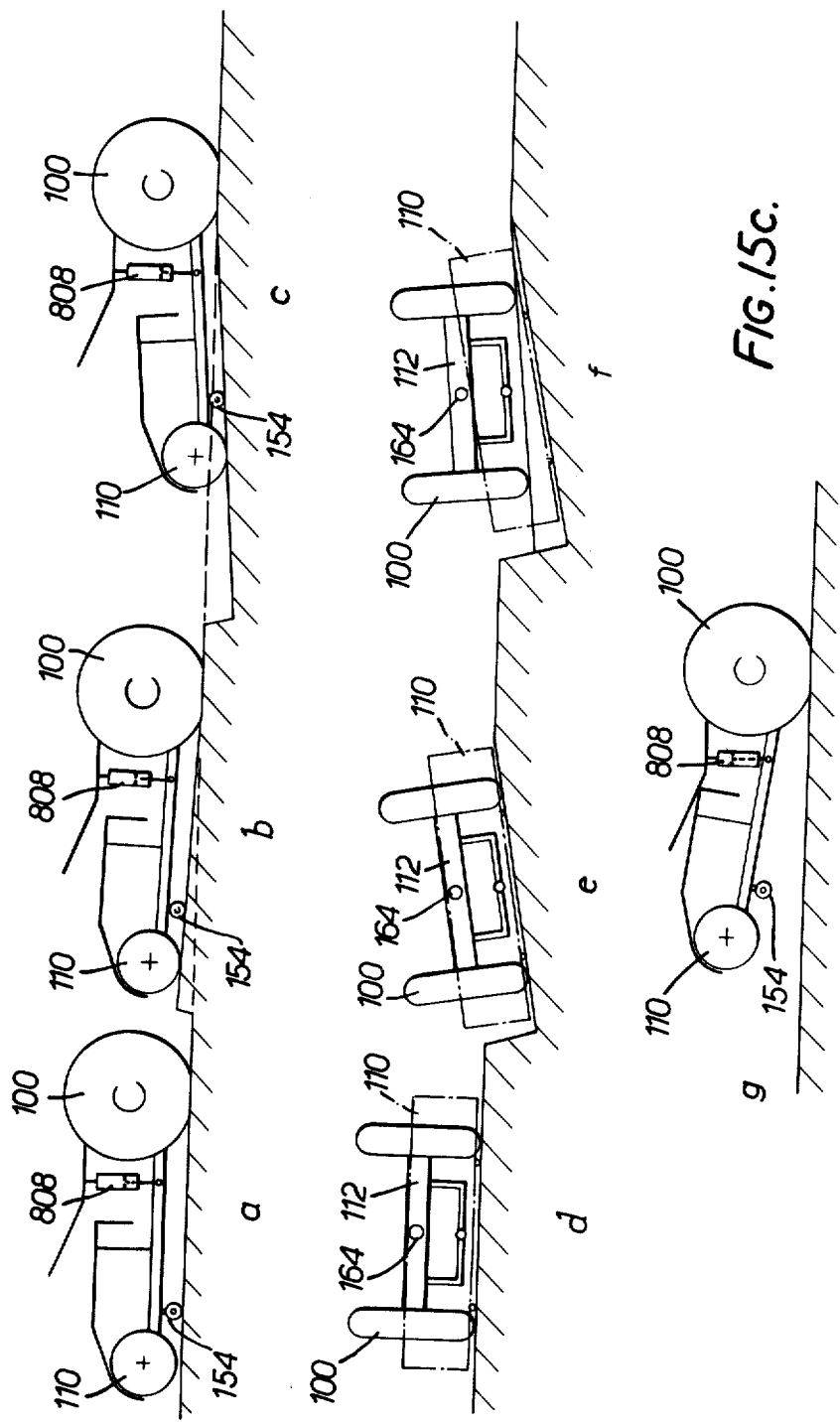
FIG. 15C is a series of diagrams illustrating the effects of various ground slopes on the levelling system of FIGS. 14, 15A and 15B.

All the conditions of use are illustrated in the diagrams of FIG. 15C:

(a) Threshing device of the machine level—reel 110 level considered in the fore and aft direction;

(b) Threshing device of the machine level—reel pivots upwardly considered in the fore and aft direction;

(c) Threshing device of the machine level—reel pivots downward considered in the fore and aft direction;

(d) Threshing device of the machine level—reel considered in the lateral direction;

(e) Threshing device of machine and reel parallel to ground considered laterally;

(f) Threshing device of machine and reel both parallel to ground locally; but the local ground slopes are different laterally of the machine;

(g) Machine and reel on level ground, but reel 110 in transport position.

Referring now to FIGS. 14, 15A, 15B, 16A, 16B, 17 and 18A the system includes a levelling frame 800 (also in FIG. 2A) pivotal at 801 on the main machine axle 802 which axle carriers at 805 the frame supporting the threshing device of the harvester. When this axle 802 becomes inclined in dependence upon the side slope of the field, the frame 800 assumes the same inclination. The pivot shaft 164 is located at the front of the frame 800 around which the pick-up reel frame 132 can pivot laterally (FIG. 14) independently of the inclination of the axle 802.

Longitudinal or fore-and-aft levelling is accomplished totally by the frame 800 with its pivot connections 801 on the main machine axle 802.

As best seen in FIG. 14 pivots 801 for the reel levelling frame 800 on the main machine axle 802 are at a location which is as low as possible to prevent the friction generated at the sensing rollers creating a moment tending to dig the reel 110 into the soil.

As the load on the ground-sensing rollers 154,155 must not be too great, one or two or more hydraulic actuators 808 are provided which will take up most of the weight of the pick-up device, leaving only a small proportion of the weight on the rollers 154,155 such that ground-roller contact is always maintained. The actuators 808 are connected at their upper ends to the machine frame 810 and to the reel levelling frame 800 at shackles 804. The pick-up reel 110, its frame 112 and associated parts have been described herein with reference to FIGS. 1 and 2A.

The hydraulic balancing system is used for lateral levelling of the reel and associated parts and takes into account the movements of the threshing device relative to the machine frame.

The lateral levelling of the pick-up reel 110 to follow the ground irregularities is totally mechanical and is effected by the two sensing rollers 154 acting through the actuators 808 and the central pivot shaft 164.

Figure 16A:
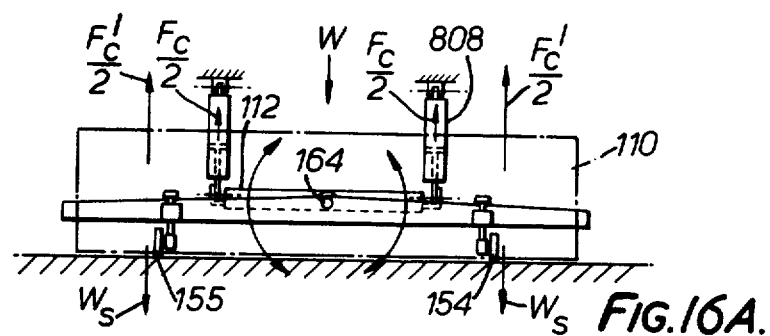
FIG. 16A is a front elevation indicating operation of the levelling system of FIG. 14 for lateral levelling.
Figure 16B:
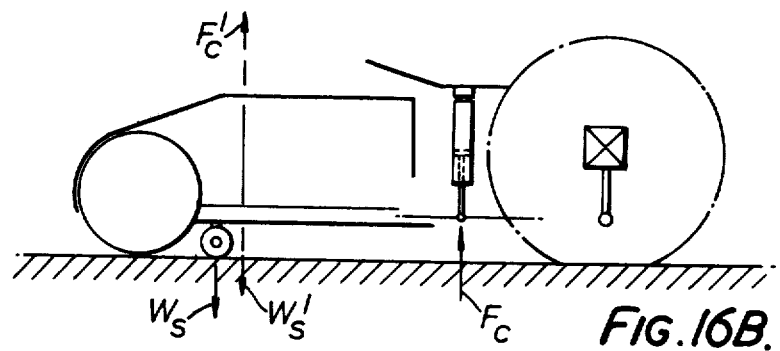
FIG. 16B is a side elevation showing forces acting for lateral levelling.

The forces acting on the sensing wheels 154 and 155 ond on the actuators 808 are indicated in FIGS. 16A and 16B. If W is the total weight of the pick-up reel assembly, Ws is the force applied to the ground by each sensing wheel 154, 155, and $F_c/2$ is the force exerted by each actuator 808 when $W - F_c = 2W_s$. Or, in words, each wheel supports half and difference between the weight of the assembly and the upwards force of the actuators. $F_c$ is chosen so that $W_s$ is small but sufficient to ensure that the wheels follow the ground contours.

Figure 17:
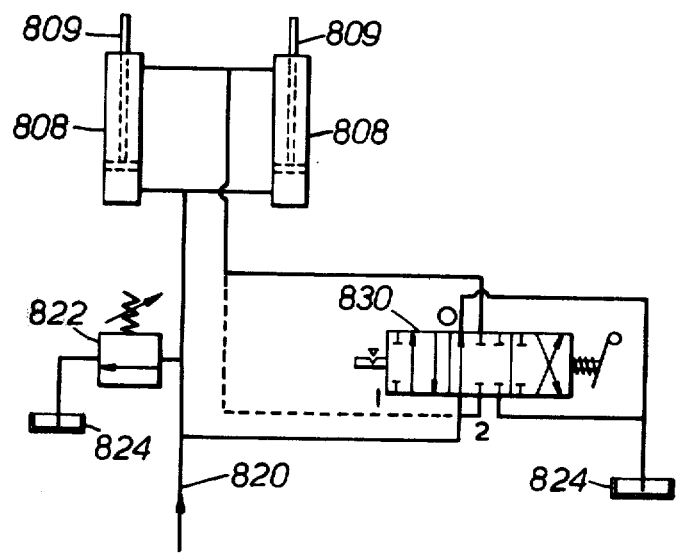
FIG. 17 is a diagram illustrating one form of hydraulic circuit of the levelling system.
Figure 18A:
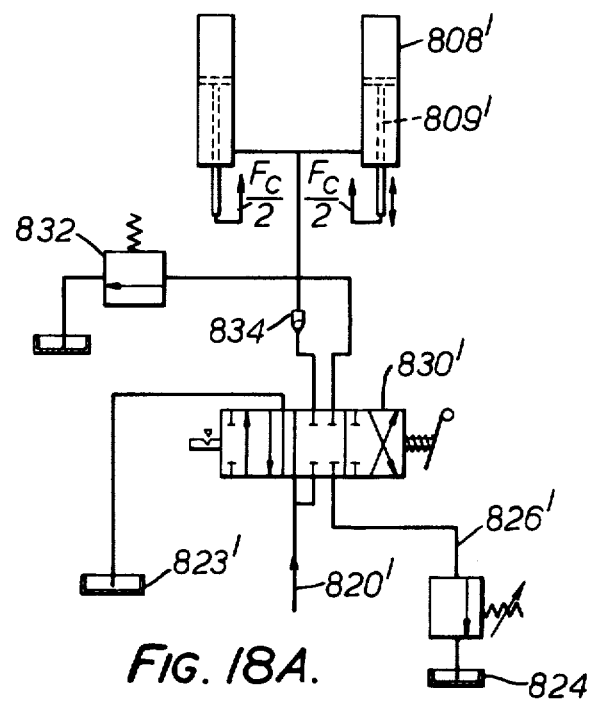
FIGS. 18A and 18B are diagrams illustrating two other forms of hydraulic circuit.
Figure 18B:
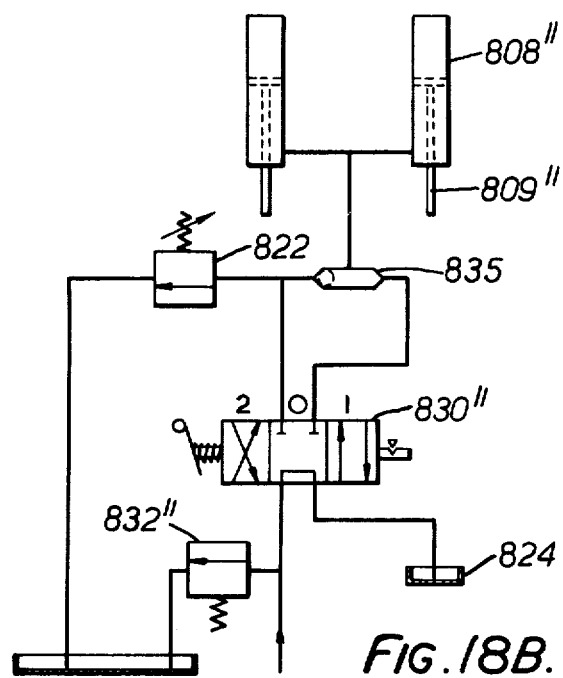

Two hydraulic balancing systems are shown diagrammatically in FIGS. 17, 18A and 18B. These diagrams represent different embodiments of the hydraulic systems, such as the number of cylinders used and the way these cylinders are orientated and connected.

FIG. 17 shows an embodiment with the cylinder(s) 808 having piston rod(s) 809 extending upwardly; a continuous oil flow is pumped into the system from source 820 at a constant pressure p, as set by an adjustable relief valve 822 in a pipe leading to a reservoir 824 (sink). This pressure p acts on both faces of the piston(s) so that the rod(s) are pushed upward with a force Fc(Fc/2) due to the different effective areas on each side of the piston.

Any change in the position of the frame 800 moves the piston rods 809. The continuous oil flow will follow these movements such that the pressure p is maintained by the control exerted by valve 822 and thus the small load on the ground sensing rollers 154,155 will always maintain contact with the ground.

This mode of operation is achieved with the manually-controlled hydraulic valve 830 in position 1. When position 2 of valve 830 is set, the pressure above the piston(s) in the cylinders 808 is relieved to pressure in reservoir 824 as the pressure p then acts only on the lower (and larger) piston area, the force Fc will increase until the pick-up device 110 starts to rise to the transport position.

After locking the pick-up reel 110 in the transport position, the valve 830 is manually switched over to position O (as shown), which will lead the oil directly to the reservoir 824 so that no head can build up during road transportation.

FIG. 18A shows a system with piston rod(s) of the cylinder(s) 808' extending downwardly.

A continuous oil flow feeds the system from a source 820' and a relief valve 826' maintains a certain pressure p', but in this system only on the underside of the piston(s). The chamber(s) of the cylinder(s) above the piston(s) is (are) vented.

Pressure p' is again chosen such that forces Fc/2 (or Fc only) are produced and the piston rods release for upwards movement against pick-up device load.

This arrangement corresponds to the valve 830' being in position 1.

When the valve 830' is switched to position 2, the relief valve 826' is disconnected from the system by connection to a check valve 834 and the system works now against a second relief valve 832 set at a higher pressure p" sufficient to lift the pick-up assembly totally.

After locking the pick-up assembly in the raised position, switchover to position O again leads the oil to the reservoir 823' (sink).

In the embodiment of the hydraulic circuit illustrated in FIG. 18B, similar parts to those of FIG. 18A have been used with the addition of a further prime. The non-return valve 834 is replaced by a shuttle valve 835 which provides for automatic shut-off from communication with one or other of the pressure-limiting valves 822" and 832".

With the control valve 830" in position 1 hydraulic fluid is supplied to the cylinder 808" while the circuit communicates with pressure-limiting valve 822". The harvester will then be operating in the field.

With the control valve 830" in position 2 to which the valve is biased by a spring, the hydraulic fluid is supplied to the cylinders 808" while the circuit communicates with pressure-limiting valve 832". Since the valve 832" limits pressure at a higher valve the cylinders are elongated to a greater extent and the reel is raised upwards beyond the normal working position. The shuttle valve 835 acts to cut off the line communicating with the pressure-limiting valve 822".

With the control valve 830" in the O position hydraulic fluid is returned directly to the reservoir or sink 824. The hydraulic cylinders are thereby allowed to their smallest elongation and the harvester is then ready for transport away from field operations.

To operate the threshing device efficiently it is necessary that it should remain correctly orientated whatever the slopes of the ground and a harvester in accordance with the invention will be provided with a control system known per se to achieve this. However the value of such a system is limited because losses of crop can occur between the pick-up reel 110 and the threshing drum 300 if the conveyor arrangement is unable to accommodate slopes satisfactorily.

The trouble-free product transfer irrespective of ground irregularities can be provided by interconnections of the conveyors 130, 180 and 200 as shown, in every relative position as illustrated in FIGS. 19A to 19F.

Figure 19A:
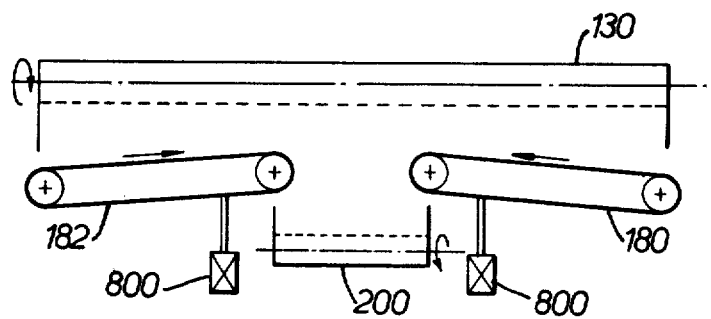
FIGS. 19A to 19F are diagrams illustrating the manner of operation of the levelling systems both laterally and fore and aft.
Figure 19B:
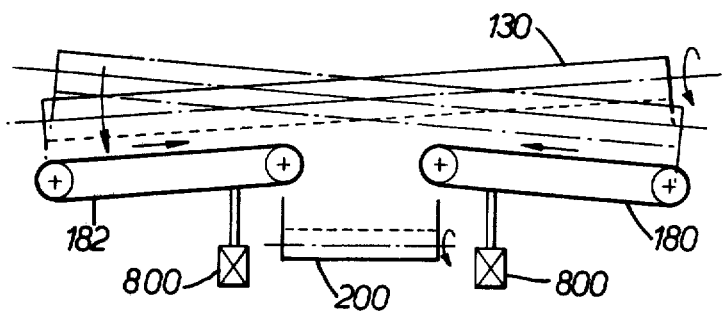
Figure 19C:
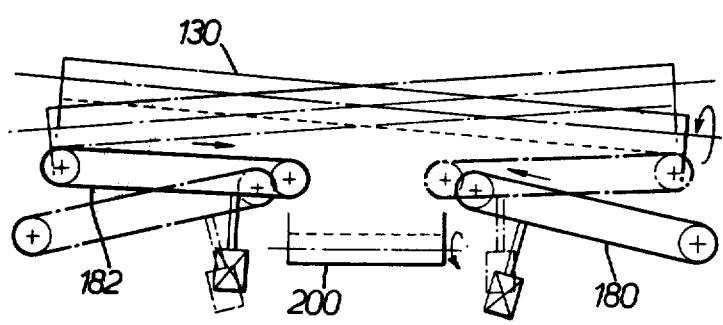
Figure 19D:
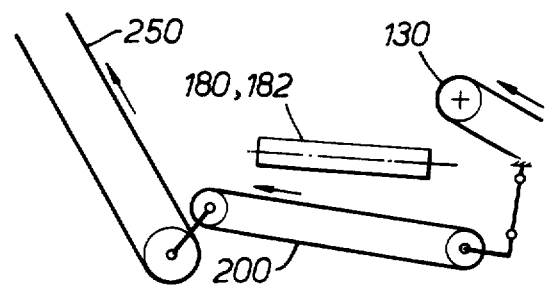
Figure 19E:
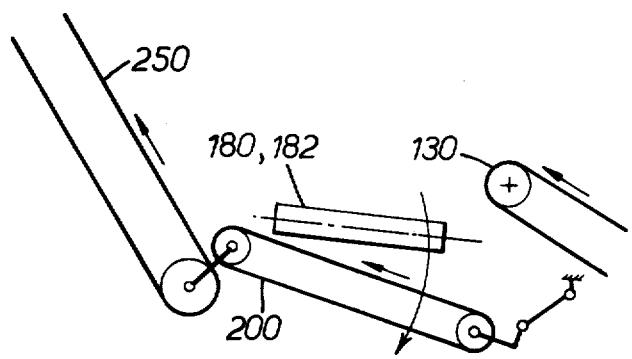
Figure 19F:
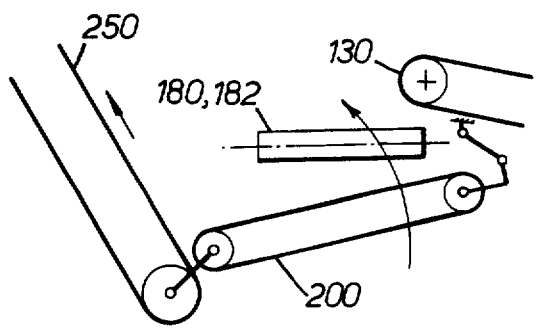

Conveyor 130 is maintained in a position relative to the pickup reel 110 such that no product loss is encountered when product is thrown by the reel 110 on the conveyor 130 (see FIG. 19B).

The transverse conveyors 180 and 182 are fixedly mounted on respective members of the levelling frame 800. As such it is only the extra lateral adjustment of the picking reel 110 itself which will cause a position difference between conveyors 130 and 180, 182 (see FIG. 19C).

The other component of the lateral adjustment is taken up at the transfer from the conveyors 180, 182 to the intermediate longitudinally-extending conveyor 200. Owing to splitting the transverse flow into two, a good transfer of crop is ensured under all conditions.

Fore-and-aft levelling is in turn (see FIGS. 19D-F) accommodated at transfer from the transverse conveyors 180, 182 to the conveyor 200 and from the conveyor 200 to the elevator conveyor 250. The conveyor 200 is supported pivotally in the longitudinal direction at the higher, rearward, end on the frame of the elevator 250 and by a double ball joint (for both longitudinal and lateral movements) at the lower part of the conveyor 200 on the frame 800.

In operation, self-mobile harvesting machine is controlled from the platform 106 which includes a console incorporating not only the usual gauges and warning lights required for driving but also gauges, warning lights and controls relevant to the harvesting machine in itself. The pick-up reel 110, which is wider than the wider track of the two pairs of wheels 100,102 uproots or at least tears off the vines, carries them over an arcuate path of approximately 270° and deposits the vines on to the lower end of the conveyor 130. This carries the vines, while still spread out, on to the two centering conveyors 180,182 which deliver the vines to the intermediate conveyor 200. This, in turn, delivers the vines to the elevating conveyor 250 which moves the vines, substantially without loss to the inlet of the threshing drum 300. So far, all the movement, apart from that on the transverse movement on the conveyors 180,182, has been generally rearwardly.

After threshing in the drum 300 which is maintained horizontal under all conditions, the peas are received on the apron conveyors which serve to allow the peas to fall or roll downwardly while dirt and trash are carried upwardly and discharged to the ground. This provides a first cleaning stage of the threshed peas. At the junction between the horizontal conveyor 400 and the bucket elevator 422 there is a gap subjected to an upwardly-directed draft of air generated by the fan 426. Dust and other trash are carried upwardly while the peas follow a trajectory on to the lower run of the bucket elevator 450. The air flow generated by the fan is controlled to avoid entraining peas. This is the second cleaning stage.

The bucket elevator 450 receives partially-cleaned peas and discharges them on to the upper, forwardly-moving, run of the conveyor 500.

Over the mouth of the hopper 600, the conveyor discharges peas and any remaining dirt and trash on to the upper run of the moving sieve 550 (horizontal podder conveyor). The fan 554 lying above the hopper opening serves to draw off any remaining dust, trash etc., and also actively and continuously prevents the apertures of the sieve from becoming blocked, particularly under wet conditions. Any unthreshed pods or pieces of dirt will carry over into the spaces enclosed by the cover 558 to be thrown again on the upper runs of the transverse infeed conveyors 180,182 below for recycling. The chain 550 prevents any large pieces of dirt falling into the hopper. This arrangement forms the third cleaning stage.

Figure 20:
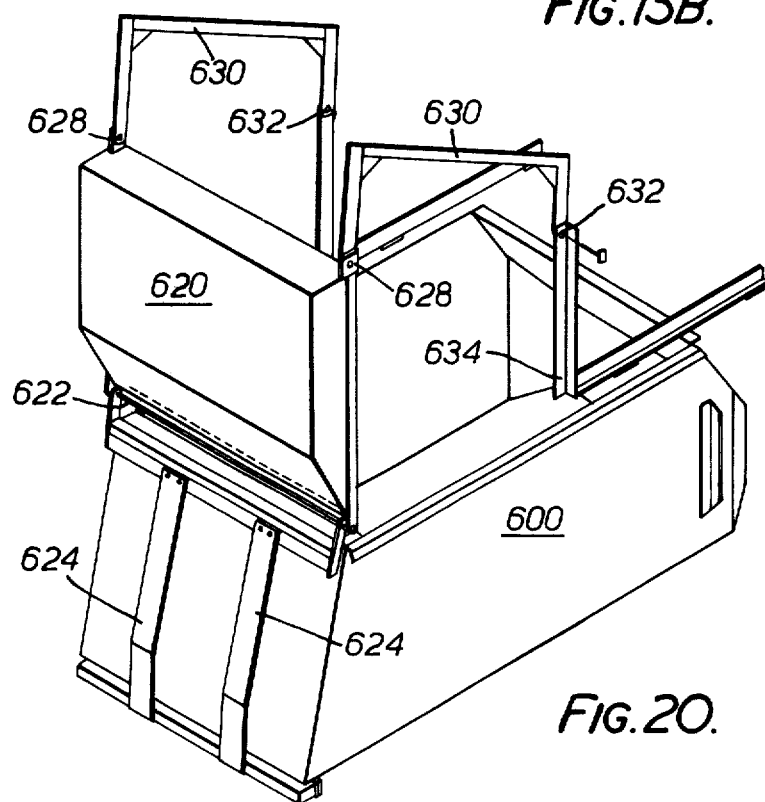
FIG. 20 is a perspective view of a hopper assembly.

Dumping during operation can be accomplished when using the secondary hopper 620 (see FIG. 20).

When the primary hopper 600 is moved sideward for dumping in a truck driving beside the harvester, the secondary hopper 620 is pulled under the podder chain 550 and will receive the peas which are produced during dumping. When the main hopper 600 is retracted, the secondary hopper 620 is tipped upwards such that the peas collected therein fall into the main hopper.

As is indicated in FIG. 1, the pick-up reel 110, the cover 124 and associated parts can be raised to the broken line position 124A to facilitate road transport. This is made possible because the conveyor 200 is pivotally mounted at both ends and raising is effected by use of the control valve of one of the hydraulic systems.

Throughout operation of the harvester, the reel and associated parts are controlled to follow the ground contours as hereinbefore described while the threshing drum is maintained substantially horizontally at all times.

It will be noted that overall, the path of the vines is generally rearwardly and after threshing is generally forwardly, the hopper lying immediately behind the driving position. This general arrangement foreshortens the machine and provides for better weight distribution, which is important since heavy load concentrations on particular wheels results in harmful over compaction of the soil.

The use of air-flows between conveying stages enables good cleaning of the peas without substantial additional complication or moving parts. The further cleaning provided by the moving sieve 550 ensures that little if any trash, dirt or soil remains mixed with the peas in the hopper. The moving sieve, provides that even under adverse wet, conditions, the sieve apertures will not become blocked.

The system which maintains the threshing drum substantially horizontal may be any conventional system for example as disclosed in British Patent Specification No. 784,185.

Although the harvester described and claimed is primarily intended for harvesting peas, other crops can be harvested which require separation of parts during operation.

Although the best mode contemplated for carrying out the present invention has been herein shown and described, it will be apparent that modification and variation may be made without departing from what is regarded to be the subject matter of the invention.

We claim:

1. In a pea harvester, a pick-up reel extending at least over the full width of the track of the harvester, a first conveyor of a width substantially corresponding to that of the reel and disposed rearwardly of the pick-up reel to receive vines therefrom, transverse, second, conveyors, an upwardly-inclined, relatively narrow, third conveyor, said second conveyors being arranged to receive vines from the first conveyor and to centralize the vines to a station where they are received by the third conveyor, an elevating conveyor of a width substantially corresponding to the width of said third conveyor and arranged to convey the vines upwardly, a rotary threshing drum with its axis of rotation extending longitudinally of the harvester and disposed to receive vines from the elevating conveyor, said drum serving to thresh the peas, cleaning conveyor means running below the drum, to receive peas from the drum, a pea conveyor extending below the threshing drum arranged to receive the peas from the cleaning conveyor means and serving to convey the peas forwardly of the harvester, an elevator receiving peas from the pea conveyor, a horizontal conveyor receiving peas from the elevator, a movable endless sieve receiving peas from the elevator, and a hopper with the upper run of the movable sieve lying over an opening into the hopper and allowing only peas to fall into the hopper.

2. A harvester according to claim 1 comprising means enabling pivotal movement of an assembly comprising the pick-up reel, the first conveyor, the transverse conveyors and the third conveyor, relative to the elevator, and sensing means sensitive to changes in ground level operative to control said pivotal movements.

3. In a pea-harvester, a pick-up reel, a first conveyor arranged to receive picked vines from the reel and extending rearwardly of the reel, transverse second conveyors arranged to receive vines from the first conveyor and to centralize the vines, an upwardly, rearwardly inclined third conveyor arranged to receive vines from the transverse conveyors, an elevating conveyor arranged to receive vines from the third conveyor, a threshing device arranged to receive vines from the elevating conveyor, means for maintaining the orientation of the threshing device irrespective of the inclination of the field, and means for varying the orientation of an assembly comprising the pick-up reel, the first conveyor, the transverse conveyors and the second conveyor in dependence upon ground variations whereby the supply of vines to the threshing device is maintained under all field conditions.

4. In a pea-harvesting machine, crop pick-up means extending at least over the full width of the the wider track dimension of the machine, a first, longitudinally-extending, conveyor of a width corresponding to that of the pick-up means and disposed rearwardly of the pick-up means to receive crop therefrom, two transverse, second conveyors arranged to receive crop from the first conveyor and to deliver it to a position approximately at the center of the machine, and a longitudinally-extending, third, conveyor arranged to receive crop from the transverse conveyors for onward transmission to threshing means of the machine.

5. In a pea-harvesting machine, crop pick-up means, a first conveyor extending longitudinally of the machine having a width substantially equal to that of the pick-up means and forming a first assembly with the pick-up means, two transverse, second, conveyors mounted to receive crop from the first conveyor and forming a second assembly, and a third conveyor arranged to receive crop from the transverse conveyors and forming a third assembly, said assemblies being movable relative to one another in order to accommodate changes in ground contours.

6. A self propelled pea harvesting machine comprising a frame structure; threshing means supported on said frame; means, connecting said threshing means to the frame for maintaining the orientation of said threshing means constant in space irrespective of local ground undulations; and means for gathering and conveying standing crop to said threshing means, said last mentioned means comprising means mounting said gathering means to follow the ground undulation and means for maintaining the orientation of said conveying means so that crop can continue to be received from said gathering means and conveyed to said threshing means substantially without loss irrespective of the ground undulations, said conveyor means include a plurality of conveyors, end portions of each of which overlap adjacent end portions of other ones of the conveyors, an intermediate one of said conveyors being mounted at each end portion for pivotal movement relative to the other conveyors.

7. A pea-harvesting machine according to claim 6 wherein means is provided at one end portion of said one of the conveyors enabling pivotal motion about several axes.

8. In a self-propelled pea harvesting machine, standing crop gathering at the front of the machine, means for supporting the gathering means to follow the ground slopes, conveyor means rearwardly of the gathering means arranged to receive crop from the gathering means, thresher means, means for maintaining substantially constant the orientation in space of the threshing means irrespective of the ground slopes, and means linking the gathering means and the conveyor means such that the supply of threshold crop to the threshing means can continue irrespective of the orientation of the gathering means and the conveying means relative to the threshing means, said gathering means comprises a transversely extending, tine-carrying reel and the conveyor means comprises a first conveyor extending rearwardly from the reel and having a width substantially equal to that of the reel, at least one transverse second conveyor mounted to receive crop from the first conveyor, a third conveyor extending rearwardly and disposed to receive crop from said transverse conveyor, and an elevator conveyor arranged to raise crop received from the third conveyor to an intake of the threshing means and wherein the linking means includes, pivotal linkages between the first and second and between the second and third conveyors, the elevator conveyor being fixed relative to the threshing means.

9. A pea harvester according to claim 8 wherein the linking means comprises linkages connecting the front end of each second conveyor to a frame defining a forward extension of said frame structure of the machine, and linkages pivotally connecting the front end of the third conveyor to the said frame.

10. A self propelled pea harvesting machine comprising a frame structure; threshing means supported on said frame; means, connecting said threshing means to the frame, for maintaining the orientation of said threshing means constant in space irrespective of local ground undulations; and means for gathering and conveying standing crop to said threshing means, said last mentioned means comprising means mounting said gathering means to follow the ground undulations and means for maintaining the orientation of said conveying means so that crop can continue to be received from said gathering means and conveyed to said threshing means substantially without loss irrespective of the ground undulations, said means mounting said gathering means and said conveying means comprise an elongate forwardly extending from having one end pivotally connected to said thresher frame structure and an elongate transversely extending frame pivotally connected to the other end of said forwardly extending frame, said conveying means comprising a transversely extending conveyor mounted to receive crop from said gathering means and conveying it rearwardly and having a width substantially equal to the width of said gathering means, said gathering means and said transversely extending conveyor being supported on said transversely extending frame, and centering conveyors and a centrally disposed conveyor mounted on said elongate forwardly extending frame mounted to receive crop from said transversely extending conveyor.

11. A pea harvester comprising a pickup reel for gathering standing crop and vines, transverse conveyors arranged to receive and move crop and vine fragments toward the longitudinal centerline of the machine, an upwardly rearwardly inclined conveyor arranged to receive vines from the transverse conveyors, an elevating conveyor arranged to receive vines from the rearwardly inclined conveyor, a threshing device arranged to receive vines from the elevating conveyor, means for maintaining the orientation of the threshing device constant irrespective of the inclination of the field, and linking means for varying the orientation of the individual components of an assembly comprising the pickup reel, the transverse conveyors and the rearwardly inclined conveyor in dependence upon ground variations whereby the supply of vines to the threshing device is maintained under all field conditions.

12. A pea harvesting machine comprising crop pickup means, means for controlling the orientation of the crop pickup means to follow ground contours, a conveyor and two transverse conveyors rearwardy of the pickup means, and a conveyor arranged to receive crop from the transverse conveyors, said transverse conveyors being moveable relative to one another in order to accommodate changes in the orientation of the pickup means in response to changes in ground contours and to continue to supply crop to the threshing means of the machine irrespective of such ground contour changes.

13. A self propelled legume harvesting machine comprising means for stripping the vines; means for delivering the stripped product rearwardly; threshing means for receiving the stripped product from said delivery means; rigid supports carrying, respectively, said stripping means and said delivery means, and a main frame carrying threshing means; means for maintaining said threshing means substantially level so that the threshing means can continue to efficiently effect threshing; and means, including longitudinally spaced transverse and longitudinal pivotal connections, interconnecting said supports such that said stripping means can follow the ground contours, the major portion of the weight of said supports being partially suspended from said main frame so that said stripping means promptly adjusts to changes in ground contour.

14. A harvesting machine comprising longitudinally adjacent pivotally interconnected frames one of which is pinned to the forward end of the machine, means at the front end of the foremost frame for gathering standing crop, means on the foremost frame rollingly engageable with the ground providing an input to a control operating suspension means that maintains, in response to pivotal movement of said frames, substantially constant ground pressure of said ground engaging means to constrain the gathering means to follow and maintain a selected distance above the ground slopes, conveyor means carried by said frames and positioned rearwardly of the gathering means, and threshing means rearwardly of the conveyor means arranged to receive crop from the conveyor means.

15. A pea harvesting machine according to claim 14 wherein said frames mounting said gathering means and said conveying means comprise an elongate, forwardly-extending frame having one end portion pivotally connected to a frame supporting said threshing means, and an elongate transversely extending frame pivotally connected to the other end portion of said forwardly extending frame.

16. A harvesting machine according to claim 14 wherein the conveying means further comprises centering conveyors and a centrally disposed conveyor mounted on said elongate forwardly extending frame.

17. A harvesting machine according to claim 15 wherein said suspension means comprises hydraulic cylinders each pivotally connected between the frame supporting and threshing means and the forwardly-extending frame, said cylinders being connected in a circuit to said control, which is operative, in response to movement of said gathering means as it encounters changes in ground contour, to equalize the pressure of said hydraulic cylinders and thereby maintain said gathering means a selected distance above the ground.

18. A harvesting machine according to claim 15 wherein the conveyor means includes two conveyors operable to receive crop from the gathering means and move the crop toward the longitudinal centerline of the machine, each of said conveyors being connected to said forwardly extending frame so that pivotal movement of the forwardly extending frame relative to the frame supporting the threshing means causes corresponding angular adjustment of each of said conveyors.

19. A pea harvesting machine comprising threshing means, means for maintaining the orientation of the threshing means substantially constant in space irrespective of local ground slopes, means for gathering standing crop and for passing the crop to the threshing means including individual conveyors whose orientation relative to one another is adjustable within limits whereby the threshing means can continue to receive crop for threshing substantially without loss irrespective of the ground slopes over which the machine is traveling, sensing means for controlling the orientation of the gathering means to follow the ground slopes, said sensing means comprises a ground-engaging member closely adjacent the gathering means, and a hydraulic system operative to limit the force exerted by said ground engaging member whereby a portion of the weight of the gathering means is sustained by the main frame of the machine.

* * * * *